United States Patent
Bharadwaj et al.

(10) Patent No.: US 11,047,970 B2
(45) Date of Patent: Jun. 29, 2021

(54) MULTI-MODE RADAR SYSTEMS, SIGNAL PROCESSING METHODS AND CONFIGURATION METHODS USING PUSHING WINDOWS

(71) Applicant: Texas Instruments Incorporated, Dallas, TX (US)

(72) Inventors: Sachin Bharadwaj, Bangalore (IN); Sriram Murali, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 170 days.

(21) Appl. No.: 15/587,564

(22) Filed: May 5, 2017

(65) Prior Publication Data

US 2018/0321368 A1 Nov. 8, 2018

(51) Int. Cl.
*G01S 13/42* (2006.01)
*G01S 13/931* (2020.01)
(Continued)

(52) U.S. Cl.
CPC ............ *G01S 13/42* (2013.01); *G01S 13/343* (2013.01); *G01S 13/931* (2013.01); *G01S 7/288* (2013.01);
(Continued)

(58) Field of Classification Search
CPC ...... G01S 13/42; G01S 13/931; G01S 13/343; G01S 7/288; G01S 13/583; G01S 2007/2883
(Continued)

(56) References Cited

U.S. PATENT DOCUMENTS 3,737,900 A 6/1973 Vehrs, Jr.
3,949,396 A 4/1976 Cantrell
(Continued)

FOREIGN PATENT DOCUMENTS

RU 2255352 * 6/2005
WO 2255352 C2 1/2005
(Continued)

OTHER PUBLICATIONS

Machine translation of RU2255352, Jun. 27, 2005 (Year: 2005).*
(Continued)

*Primary Examiner* — Frank J McGue
(74) *Attorney, Agent, or Firm* — Ebby Abraham; Charles A. Brill; Frank D. Cimino

(57) ABSTRACT

A multi-mode radar system, radar signal processing methods and configuration methods, including using predetermined, range/mode-specific pushing windows to perform windowing on range and velocity object data before performing an FFT on the windowed object data matrix to generate a three-dimensional object matrix including range, velocity and angle data. The individual windows have an angular spectral response that corresponds to a combined angular coverage field of view of the transmit and receive antennas for the corresponding mode to minimize the total weighted energy outside the main lobe and to provide increasing spectral leakage outside the combined angular coverage field of view with angular offset from the main lobe to push out much of the spectral leakage into regions where leakage tolerance is high due to the corresponding combined angular coverage field of view of the transmit and receive antennas.

10 Claims, 11 Drawing Sheets

(51) Int. Cl.
*G01S 13/34* (2006.01)
*G01S 13/58* (2006.01)
*G01S 7/288* (2006.01)

(52) U.S. Cl.
CPC ..... *G01S 13/583* (2013.01); *G01S 2007/2883* (2013.01)

(58) Field of Classification Search
USPC .......................................................... 342/107
See application file for complete search history.

(56) References Cited

U.S. PATENT DOCUMENTS

| | | | |
|---|---|---|---|
| 5,363,103 A | 11/1994 | Inkol | |
| 5,764,551 A * | 6/1998 | McCorkle | G01R 13/0272 702/190 |
| 6,781,541 B1 | 8/2004 | Cho | |
| 9,594,159 B2 | 3/2017 | Wang et al. | |
| 2004/0027274 A1 | 2/2004 | Driessen et al. | |
| 2007/0205943 A1* | 9/2007 | Nassiri-Toussi | H04B 7/0617 342/377 |
| 2011/0109495 A1* | 5/2011 | Takeya | G01S 13/34 342/107 |
| 2015/0185316 A1 | 7/2015 | Rao et al. | |
| 2015/0276918 A1 | 10/2015 | Ramasubramanian et al. | |
| 2016/0018511 A1 | 1/2016 | Nayyar et al. | |
| 2016/0061942 A1 | 3/2016 | Rao et al. | |
| 2016/0146931 A1 | 5/2016 | Rao et al. | |
| 2016/0277007 A1 | 9/2016 | Tangudu et al. | |
| 2016/0291130 A1 | 10/2016 | Ginsburg et al. | |
| 2016/0327633 A1 | 11/2016 | Kumar et al. | |
| 2017/0045607 A1 | 2/2017 | Bharadwaj et al. | |

FOREIGN PATENT DOCUMENTS

| | | |
|---|---|---|
| WO | 2005003811 A1 | 1/2005 |
| WO | 2007095354 A2 | 8/2007 |

OTHER PUBLICATIONS

Cohen, I.; Levanon, N., "Weight windows—An improved approach," in Electrical & Electronics Engineers in Israel (IEEEI), pp. 1-5, Dec. 2014.

Harris, F.J., "On the use of windows for harmonic analysis with the discrete Fourier transform," Proc. IEEE, vol. 66, No. 1, pp. 51-83, Jan. 1978.

J.F. Kaiser and R.W. Schafer, "On the use of the I sinh window for spectrum analysis," IEEE Trans. Acoust., Speech Signal Process., vol. ASSP-28, No. 1, pp. 105-107, 1980.

Seong-Hee Jeong et al., "A multi-beam and multi-range radar with FMCW and digital beam forming for automotive application," Progress in Electromagnetic Research, vol. 124, 2012.

International Search Report and Written Opinion dated Feb. 14, 2019, International Application No. PCT/US2018/031409, 6 pages.

* cited by examiner

FIG. 6
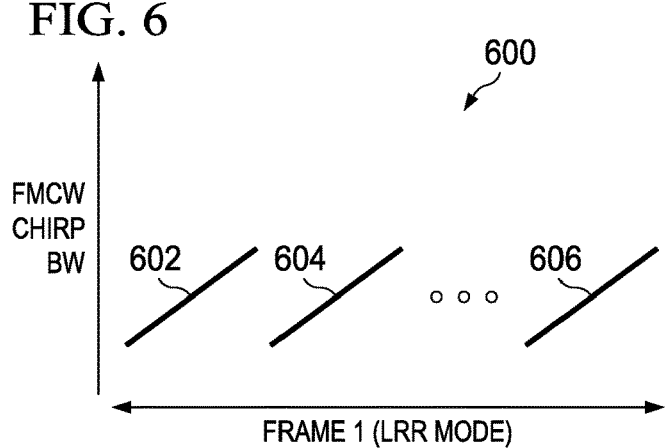
FIG. 7
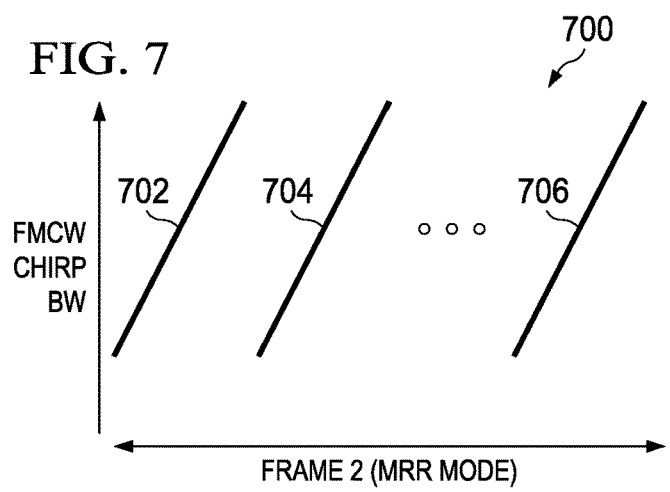
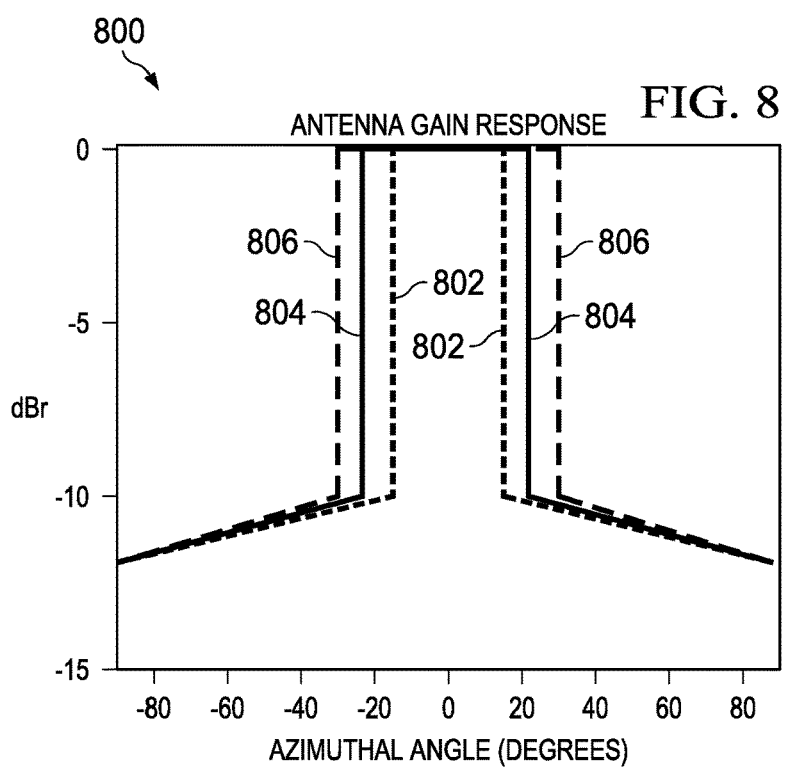
FIG. 8

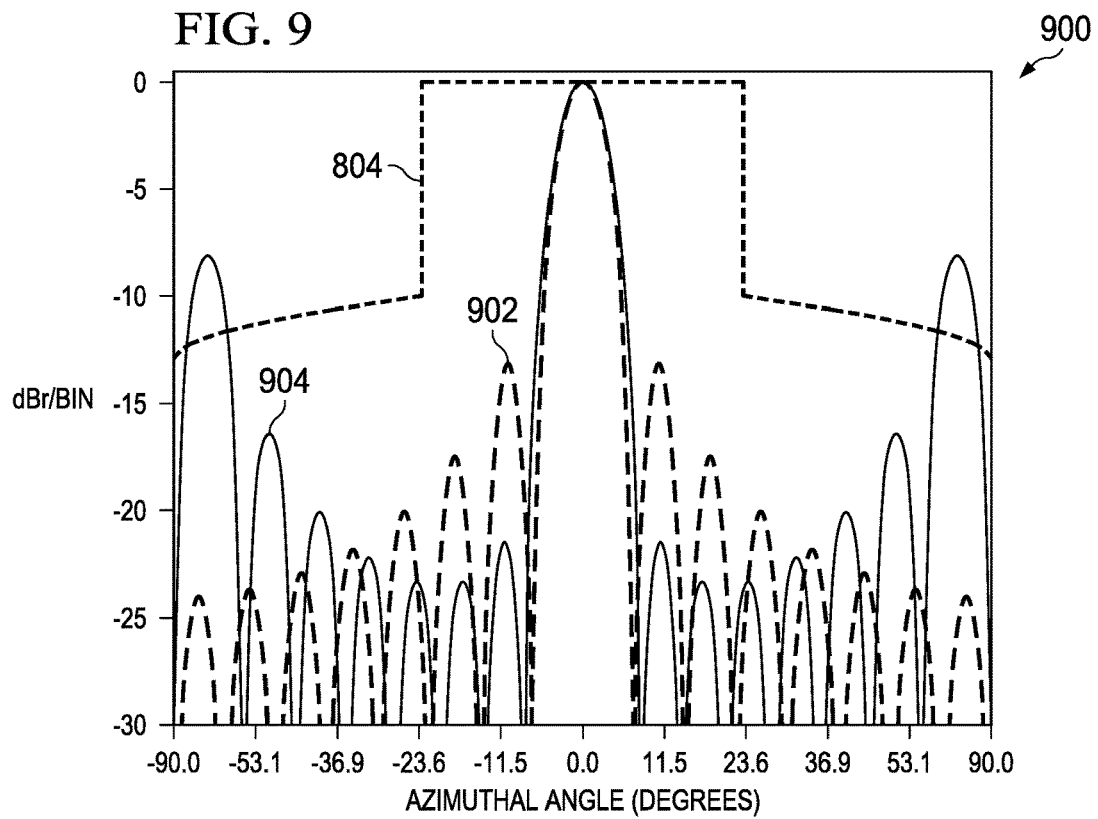
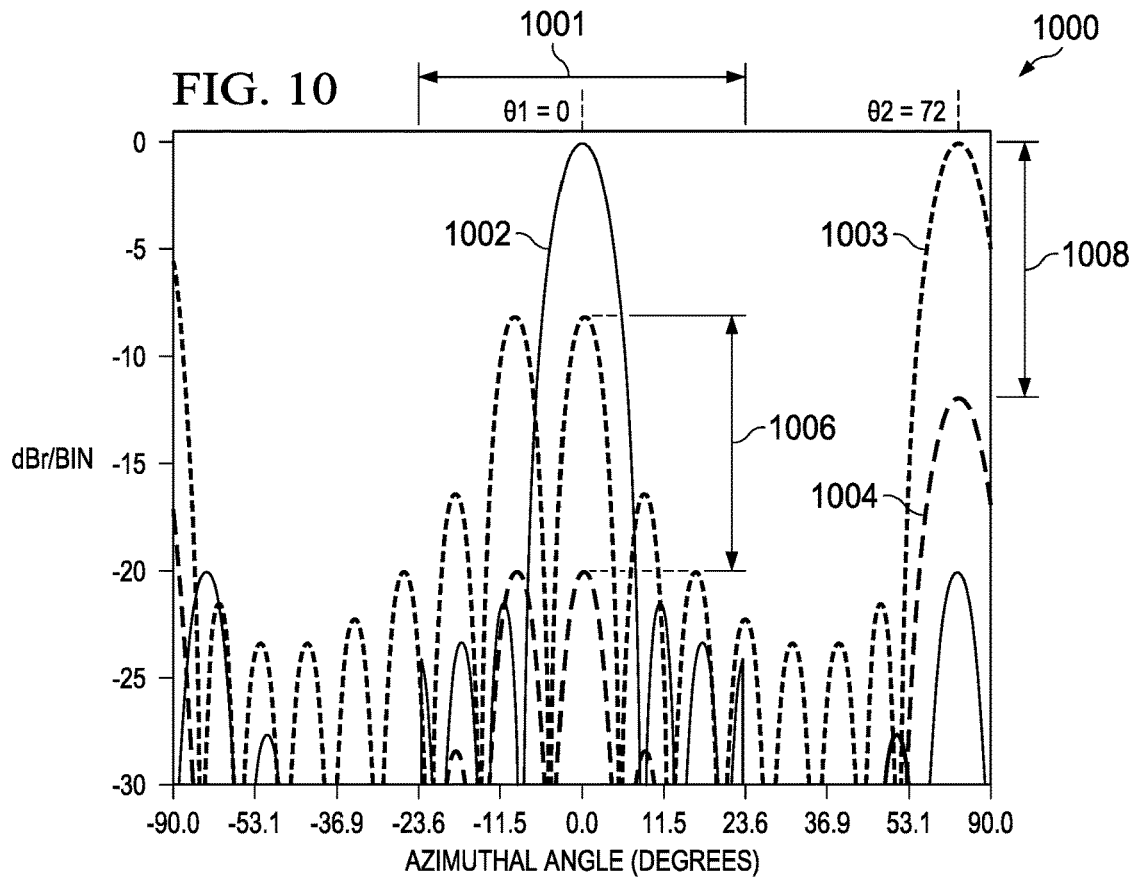

UNIFORM LINEAR ARRAY

MULTI-MODE RADAR SYSTEMS, SIGNAL PROCESSING METHODS AND CONFIGURATION METHODS USING PUSHING WINDOWS

BACKGROUND

Radar systems are used in a variety of applications, including aircraft navigation, security and defense applications, as well as automotive applications for driver assistive functions, object detection, etc. Frequency modulated continuous wave (FMCW) radar systems continuously radiate power from one or more transmit antennas to create frequency modulated signals referred to as "chirps". An array of receive antennas receive scattered or reflected signals from detected objects within the range of the transmit antenna or antennas. Multi-mode radar systems employ different chirp signals at different times in order to cover multiple radar ranges, such as long and short ranges for object detection and other uses. Certain radar systems mix the receive signal with the transmitted chirp signal to create an intermediate frequency (IF) signal to facilitate detection of objects at different ranges (distances). A first fast Fourier transform (FFT) can be performed on the received data to separate the objects in a range domain, and a second FFT can be performed for relative velocity or speed separation to yield multidimensional data indicating the range and relative velocity of detectable reflectors or objects. In essence, the distance can be estimated by estimating the frequency of the received IF signal which in turn is related to the round-trip delay and hence the range of a reflector or object. Velocity is estimated by observing the same object across multiple chirps and looking at the phase rotation or movement of the frequency difference. A third FFT can be performed across data from multiple receive chains to separate angle information. Windowing is often used on the object data prior to the angle FFT, but traditional windowing techniques have fixed spectral characteristics and are thus poor choices for multi-mode radar systems. Moreover, conventional windows typically involve a trade-off between spectral leakage and angular resolution.

SUMMARY

Multimode radar systems and methods are presented using mode-specific pushing windows for windowing object data prior to an angle detection FFT that push much of the spectral leakage to mitigate or avoid the shortcomings of conventional windowing techniques for processing radar data to determine the angular locations of objects with respect to the radar. A multi-mode radar system is disclosed, including a transmitter circuit to provide chirp signals to a transmit antenna according to a current mode, a receiver circuit and analog-to-digital converter generates received data based on signals from receive antennas. The system includes a processor or custom hardware that performs first and second FFT operations and object detection processing to generate object data indicating range and velocity. The processor/custom hardware performs windowing on the object data to generate a windowed object data matrix using a selected one of a plurality of windows that corresponds to the current mode, and performs a third FFT on the windowed object data matrix to generate an object data matrix that includes range, velocity and angle data corresponding to the current mode. In certain examples, the individual windows have an angular spectral response that corresponds to the combined angular coverage field of view (FOV) of the transmit and receive antennas corresponding to the current mode. In accordance with further aspects of the disclosure, a method is provided for processing radar signals in a multi-mode radar system. The method includes, for each mode, converting receive signals corresponding to a specific transmitted chirp signal to generate an integer number N sets of receive data, and performing first and second FFTs to generate range and velocity data corresponding to the current mode. The method further includes performing object detection processing on the range and velocity data to generate object data, performing windowing on the object data to generate a windowed object data matrix using a selected one of a plurality of predetermined windows that corresponds to the current mode, and performing a third FFT on the windowed object data matrix to generate a three-dimensional object data matrix including range, velocity and angle data corresponding to the current mode. In accordance with another aspect, a method is provided for configuring a multi-mode radar system, including, for each given mode, determining the frequency domain weight profile based on the combined angular coverage field of view of the transmit and receive antennas corresponding to the given mode, computing window coefficients for the given mode, and storing the window coefficients.

BRIEF DESCRIPTION OF THE DRAWINGS

FIG. 6 is a graph of example chirp signals for a long-range radar mode.

FIG. 7 is a graph of example chirp signals for a medium-range radar mode.

FIG. 8 is a graph of three different antenna gain response masks for combined transmit and receive antennas operating in three corresponding modes.

FIG. 9 is a graph of angular spectral response curves for a given mode for a mode-specific window for a given mode and a rectangular window.

FIG. 10 is a graph of angular spectral response curves for a first object inside the combined transmit and receive antenna field of view, and a second object outside the combined transmit and receive antenna field of view, including the combined antenna gain and excluding the combined antenna gain for the second object.

DETAILED DESCRIPTION

Figure 1:
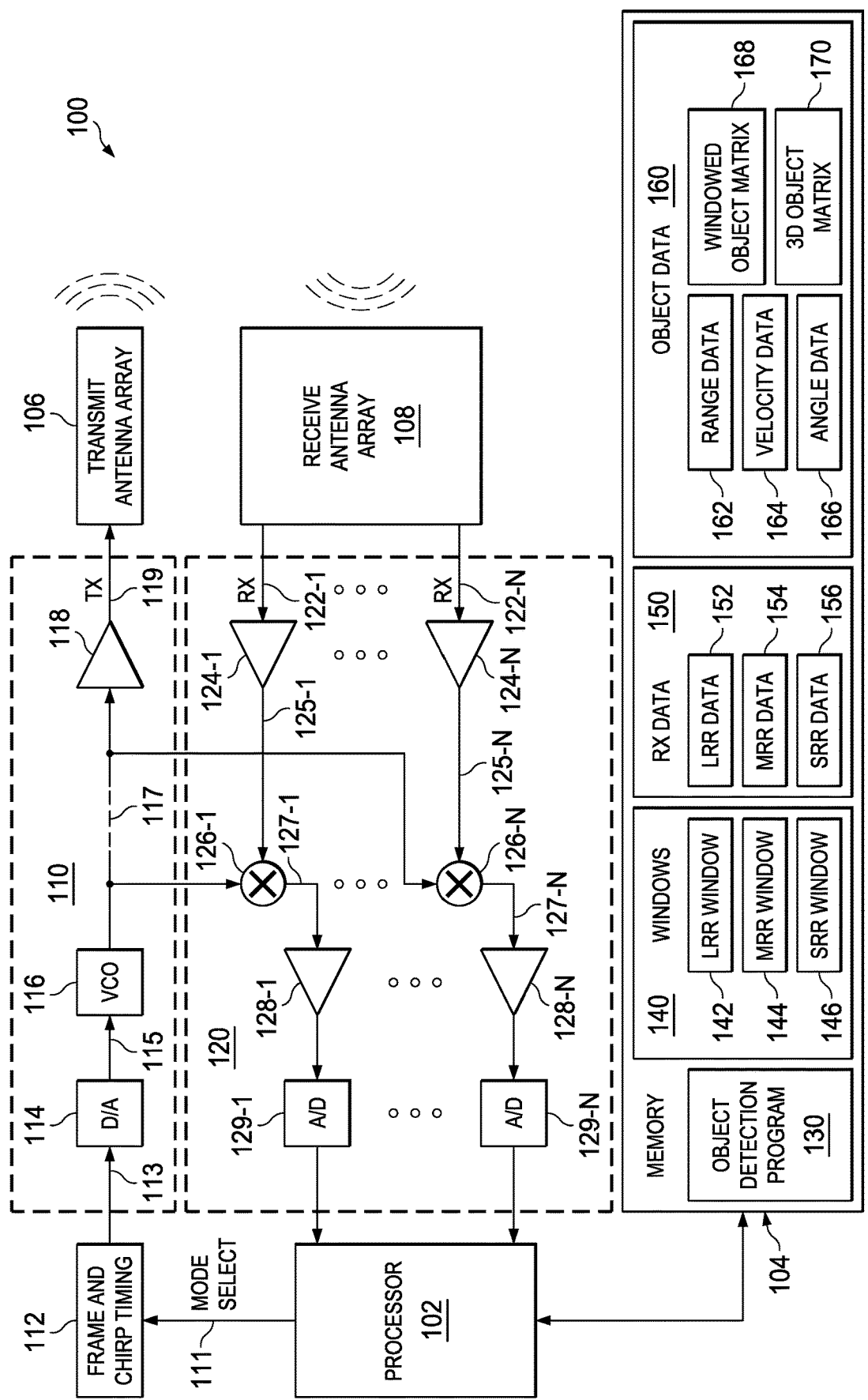
FIG. 1 is a schematic diagram of a multi-mode radar system.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the terms "couple", "coupled" or "couples" is intended to include indirect or direct electrical or mechanical connection or combinations thereof. For example, if a first device couples to or is coupled with a second device, that connection may be through a direct electrical connection, or through an indirect electrical connection via one or more intervening devices and connections.

FIG. 1 shows a frequency modulated continuous wave (FMCW) multi-mode radar system 100 with the processor 102, and electronic memory 104, a transmit antenna array 106 and a receive antenna array 108. In various implementations, the transmit antenna array 106 can include one or more transmit antennas. In this regard, although FIG. 1 illustrates a single transmit circuit chain, systems including multiple transmit antennas 106 can have separate transmit circuit chains, with the chirp generation and VCO being shared between multiple transmit circuit chains. The system 100 includes a transmitter circuit 110 configured to selectively provide frequency modulated chirp signals from a frame and chirp timing circuit 112 to the transmit antenna array 106 for transmission, and a receiver circuit 120 with inputs 122-1, . . . 122-N operatively coupled to the receive antenna array 108 in order to receive an integer number N receive signals (RX) from a corresponding set of N receive antennas of the array 108, where N is greater than 1. The receiver circuit 120 includes one or more analog-to-digital converter circuits 129-1, . . . 129-N, they provide a corresponding set of N samples to the processor 102. In certain implementations, moreover, different operating modes can, but need not, use different subsets of the transmit and receive arrays.

The processor 102 provides a mode select signal (MODE SELECT) that indicates a current mode (e.g., long, medium or short range). The signal MODE SELECT can be an analog signal or a digital value or message provided to the frame and chirp timing circuit 112 via a signaling connection 111. This sets the current mode or range of the system 100 to one of M modes. The frame and chirp timing circuit 112 can be a separate circuit as shown or can be implemented by the processor 102 in other embodiments. The frame and chirp timing circuit 112 has an output 113 which provides a corresponding baseband signal as a series of digital values to a digital-to-analog converter (D/A or DAC) 114. The digital values can define any suitable modulating waveform, such as a sinewave, a saw tooth waveform, a triangular waveform, a rectangular waveform, a staircase waveform, etc. The digital values, moreover, provide a unique waveform that corresponds to the current mode set by the MODE SELECT signal from the processor 102 for FMCW radar operation of the system 100. The chirp timing circuit 112 in one example provides a control signal to the VCO 116 that determines the nature of the frequency variation, e.g., sawtooth, triangular, etc. Also, depending on the design, the DAC can be omitted, for example, using a digitally controlled oscillator instead of an analog VCO. In certain examples, a digital baseband signal is provided through a DAC that is used to impart a phase shift on the DCO output. In certain implementations, moreover, different DACs can be used to impart different phase shifts to the signals going into different transmit antennas of the array 106 (e.g., for beam-forming). Certain implementations may also impart small frequency shifts, different for each transmit antenna channel, using a similar DAC and mixer based mechanism (not shown).

The D/A converter 114 includes an output 115 that provides an analog signal to a voltage controlled oscillator (VCO) 116. The output signal from the D/A converter 114 is modulating signal that corresponds to the digital values provided by the frame and chirp timing circuit 112 (e.g., saw tooth, sinusoidal, triangular, rectangular, staircase, etc.). In certain examples, a D/A can be included in each TX chain. Moreover, a pair of D/A converters can be used, one for I and one for Q, for a complex baseband, to induce phase and/or frequency shifts on the VCO/DCO output. The VCO 116 includes an output 117 that provides a high frequency output signal with a modulated frequency determined by the modulating voltage amplitude of the D/A output signal. The frequency of the VCO output signal has a distinct waveform that corresponds to the current mode set by the MODE SELECT signal from the processor 102. Any suitable waveforms can be used, such as having a signal bandwidth from 10 s of MHz to several GHz or more. An amplifier 118 receives the VCO output signal and provides a selected one of M distinct chirp signals TX to the transmit antenna or antennas 106 according to the MODE SELECT signal. In certain examples, the amplifier path is separated for each transmit circuit signal chain, and mixers can be used to provide phase/frequency shifting specific to each chain.

The receiver circuit 120 includes N chains, each having an input 122-1, . . . 122-N connected to provide the corresponding receive signal RX from one of the receive antennas 108 to a corresponding low noise amplifier 124-1, . . . 124-N. In one example, the transmit antenna array 106 includes 16 transmit antennas, and the receive antenna array 108 includes 16 receive antennas. Transmit and/or receive arrays 106, 108 can individually include any suitable number of antenna elements, for example two transmit and four receive antennas in another non-limiting example. In certain implementations, the antenna arrays could be physical arrays or logically realized synthetic aperture arrays (Synthetic Aperture Radar or SAR) realized using multiple radar chips working together. Amplifier outputs 125-1, . . . 125-N provide amplified high frequency signals to corresponding mixers 126-1, . . . 126-N. The VCO output 117 also provides an input signal to the mixers 126-1, . . . 126-N. The mixers 126-1, . . . 126-N mix the transmitted signal with the received signal to down convert the receive signals to provide corresponding intermediate frequency (IF) or baseband signals at outputs 127-1, . . . 127-N. In certain examples, the mixers 126 generate both the in-phase (I) and quadrature (Q) components of the IF signal. The I component may be generated by mixing the incoming signal with $\cos(2\pi \int_{-\infty}^{t} f_{LO}(\tau)d\tau)$ and the Q component may be generated by mixing the incoming signal with $\sin(2\pi \int_{-\infty}^{t} f_{LO}(\tau)d\tau)$, where t and $\tau$ represent time in seconds, and $f_{LO}(\tau)$ is the instantaneous frequency of the transmitter VCO 116 at time z. The VGA amplifiers 128-1, . . . 128-N amplify the IF signals and provide amplified IF signals to the D/A converters 129-1, . . . 129-N. An intermediate frequency bandpass filter (not shown) can be included between the mixer output and the amplifier 128 in each receive channel. In certain examples, the amplifiers 128 are variable gain amplifiers (VGAs) to amplify the IF signals.

The processor 102 executes instructions of an object detection program 130 stored in the memory 104 in order to provide object range, velocity (Doppler) and angle determination processing with respect to the radar receive signals RX from the receive antenna array 108. The processor 102 controls the chirp signal generation by providing the MODE SELECT signal to the frame and chirp timing circuit 112 and storage of the resulting mode-specific receive data 150 in the memory 104. The processor 102 in one example provides a digital front end (DFE) processing to perform decimation filtering on the digital IF signals to reduce the data transfer rate, and may perform other signal processing functions such as removal of offsets from the digital IF signals, interference monitoring on the digital IF signals, etc. In certain embodiments, a separate DFE circuit can be provided (not shown) to receive the IF signals from the A/D converters 129 to perform front-end processing, with a high-speed interface to transfer the decimated digital IF signals to the processor 102.

In one implementation, the transmitter circuit 110 operates in the 77 GHz region and produces a frequency modulated continuous wave (FMCW) signal. Frequency modulated continuous wave radar (FMCW), also referred to as continuous-wave frequency-modulated (CWFM) radar, is capable of determining distance, and signal processing by the processor 100 facilitates identification of detected object velocity and angle. A transmit signal TX of a known stable frequency continuous wave varies up and down in frequency over a fixed period of time by a modulating signal provided by the circuits 112, 114 and 116. The frequency difference between the receive signal RX and the transmit signal TX increases with the signal delay to and from a detected object or reflector, and is therefore proportional to the distance between the radar system 100 and the object. The reflected signals or echoes from a target or object are then mixed with the transmitted signal via the mixers 126 to produce the intermediate frequency beat signal which can be evaluated to determine the distance of the target after demodulation. In operation for one example, linear frequency chirp signals are transmitted and reflected signals are received. The receiver channel circuits down-convert the receive signals RX using the mixers 126 according to the transmitted chirp signals from the VCO 116. After converting the IF signals into the digital domain, The processor 102 performs fast Fourier transforms (FFTs) and tracking algorithms may be applied in order to detect objects in terms of distance, velocity, and angular position. These operations are performed for each of an integer number M modes. The processor 102 receives a stream of data from the receiver circuit 120 and performs chirp generation and control of the transmitter circuit 110 via the frame and chirp timing circuit 112. The processor 102 may perform signal processing for object detection and tracking, and may communicate with other systems in a vehicle or other host system via a network interface (not shown).

As discussed further below, the memory 104 stores an integer number M predetermined mode-specific windows 140, where M is greater than 1. For example, the illustrated memory 104 stores a long-range radar (LRR) window 142, a medium-range radar (MRR) window 144, and a short range radar (SRR) window 146 (M=3). The processor 102 receives the converted values from the A/D converters 129-1, . . . 129-N and stores these as receive (RX) data 150 in the memory 104. In one example, the stored RX data 150 includes LRR data 152, MRR data 154 and SRR data 156 obtained during operation in the corresponding modes for different ranges of radar detection by the system 100. In another example, the stored RX data 150 includes LRR data 152, MRR data 154 and SRR data 156 after computing $1^{st}$ and $2^{nd}$ FFT followed by object detection using a custom hardware.

In one example implementation, the individual mode-specific windows 142, 144 and 146 have an angular spectral response that corresponds to the combined angular coverage field of view (FOV) of the transmit and receive antenna or antennas 106, 108, for the corresponding mode that minimizes the total weighted energy outside the main lobe. In addition, the angular spectral response of the individual windows 142, 144 and 146 provides low spectral leakage within the desired field of view but increasing spectral leakage with far-off angular offset from the main lobe. This operates to push out much of the spectral leakage into regions where leakage tolerance is high due to the corresponding field of view of the combined transmit and receive antenna or antennas 106, 108, which is unlike conventional windows (e.g., rectangular windows, Hann windows, Kaiser windows, etc.). The mode-specific windows 140 are referred to herein as pushing windows. The processor 102 in one example executes the object detection program instructions 130 in the memory 104 to operate on the RX data 150 to compute or determine object data 160, which is stored in the memory 104. The object data 160 in this example includes range data 162, velocity (Doppler) data 164, angle data 166, a windowed object data matrix 168 and a three-dimensional (3D) object data matrix (170).

The processor 102 can be any suitable digital logic circuit, programmable or pre-programmed, such as an ASIC, microprocessor, microcontroller, DSP, FPGA, etc. that operates to execute program instructions stored in the electronic memory 104 to implement the features and functions described herein as well as other associated tasks to implement a radar system 100. In certain examples, moreover, the memory circuit 104 can be included within the processor circuit 102. In certain examples, the memory 102 constitutes a non-transitory computer-readable storage medium that stores computer-executable instructions that, when executed by the processor 102, perform the various features and functions detailed herein. In operation, the processor 102 executes the program instructions 130 to generate the data 160 using fast Fourier transform (FFT) operations and windowing techniques. In particular, the processor 102 uses the predetermined, mode-specific, pushing windows 142, 144, 146 from the memory 104 to perform windowing on the range and velocity object data 162 and 164 before performing an FFT on the windowed object data matrix 168 to generate the three-dimensional object data matrix 170.

Figure 2:
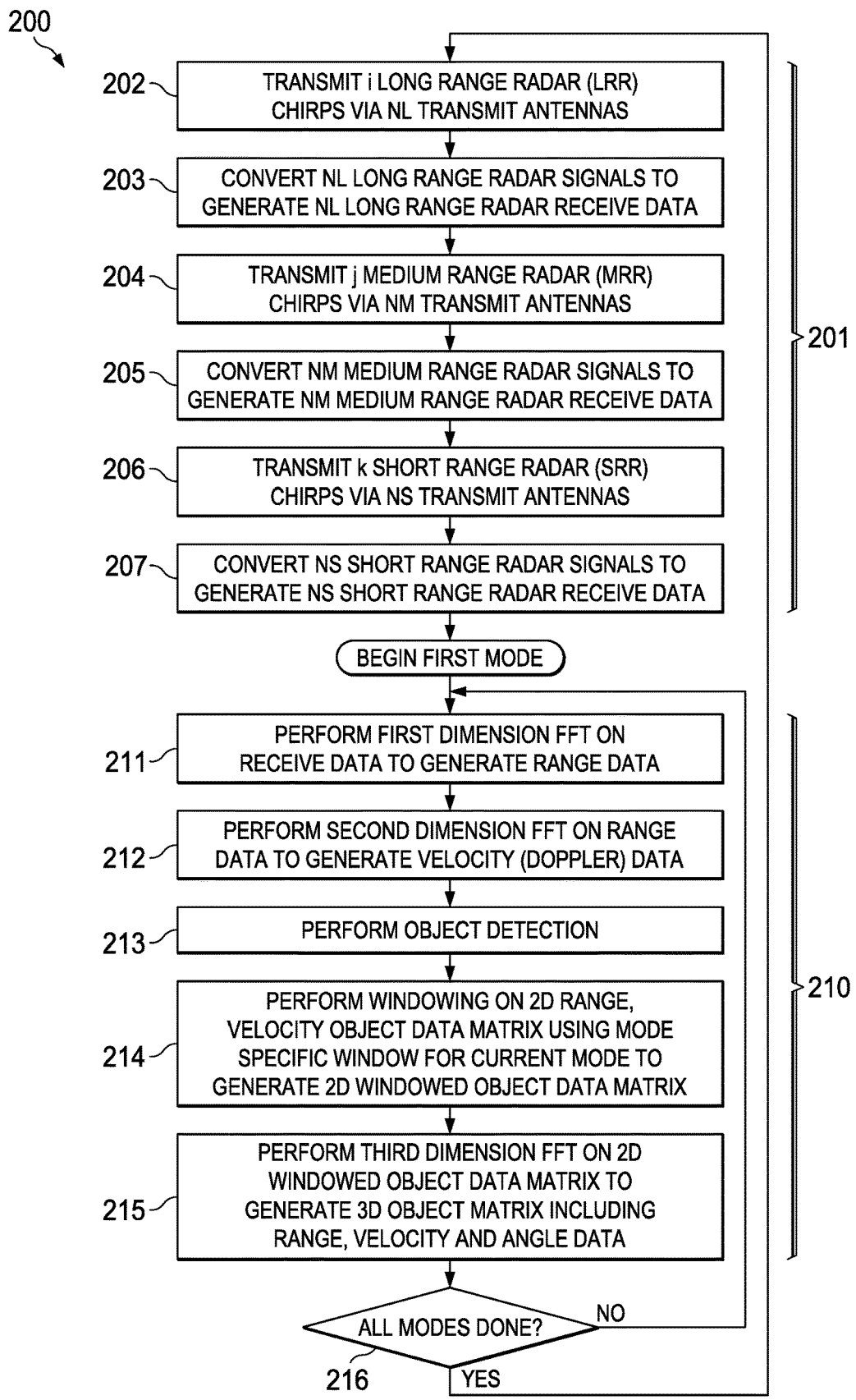
FIG. 2 is a flow diagram of a method for processing radar signals in a multi-mode radar system.

FIG. 2 illustrates a method 200 for processing radar signals in a multi-mode radar system. In one example, the processor 102 implements the method 200 in the radar system 100 by controlling the transmitter circuit 110 and receiving converted signals from the receiver circuit 120. FIG. 2 shows a non-limiting example flow, and other examples can include different sequencing/interlacing of different modes. In addition, LRR, MRR and SRR are non-limiting example modes, and there could be ultra-short range radar (USRR), short and medium range radar (SMRR), etc. Also, the number of transmit and/or receive antennas can be different for each mode in various implementations. For example, the illustrated example can use NL receive antennas for the long range data, NM receive antennas for medium range radar, and NS receive antennas for short range radar, where NL, NM and NS can be different. For each mode of M modes (e.g., LRR, MRR and SRR), the system transmits chirp signals and receives and converts corresponding receive signals RX. In the three-mode example described above (M=3), the system 100 transmits an integer number "i" long range radar (LRR) chirp signals via the transmit antennas 106 at 202 in FIG. 2. At 203, the receiver circuit 120 converts the NL LRR receive signals RX to generate and store the LRR data 142 in the memory 104. The processor 102 then changes the MODE SELECT signal to switch operation of the frame and chirp timing circuit 112 to a second mode to transmit j MRR chirp signals at 204, and NM MRR receive signals are converted at 205 and stored as the MRR data 154 in the memory 104. Similarly, chirp signals are transmitted at 206 and converted at 207 for the third mode (short range) and the SRR data 156 is stored in the memory 104. In an alternate implementation, the LRR, MRR, and SRR can be interlaced or interleaved with the MODE SELECT signal being correspondingly controlled by the processor 102, and with the FFT processing (signal processing) also correspondingly accounting for the interlacing of chirps.

Signal processing operation then begins for the first mode at 211-215 in FIG. 2. Although the illustrated example implements a range FFT followed by a velocity FFT and then an angle FFT (on detected objects), other implementations are possible in which the angle FFT need not be the final FFT. For each of the operational modes, the processor 102 in one example performs a first FFT on the received data for the current mode at 211, referred to as a first dimension FFT, to generate the range data 162, which can be stored in the memory 104 as shown in FIG. 1. At 212, the processor 102 performs a second FFT (e.g., a second dimension FFT) on the range data 162 to generate the velocity data 164 corresponding to the current mode. The locations of amplitude peaks in the range-velocity plane may be detected to estimate the range and velocity information of the targets or the reflector objects in the field of view of the antenna systems. The angle of arrival of each detected target may also be estimated for object localization and map creation or other purposes in the system 100. In addition, the processor 102 in certain examples may perform tracking to update the information of moving targets and/or to assist in assessing relative movement of a vehicle host system with respect to a stationary or moving object or target. At 213, the processor 102 performs object detection processing on the range and velocity data 162, 164 to generate object data, such as a two dimensional (2D) matrix having range and velocity (e.g., Doppler) information derived from the receive signals for the current mode.

At 214 in FIG. 2, the processor 102 performs windowing on the two dimensional object data 162, 164 to generate a windowed object data matrix 168 using one of the predetermined windows 142, 144 or 146 that corresponds to the current mode. The windowed object data matrix 168 is stored in the memory 104 as shown in FIG. 1. Thereafter at 215, the processor 102 performs a third FFT on the windowed object data matrix 168, referred to as a third dimension FFT. The third FFT at 215 generates a three-dimensional (3D) object matrix 170, that is stored in the memory 104. The object matrix 170 includes range, velocity and angle data corresponding to the current mode. The processor 102 then determines at 216 whether all M modes have been processed, and if not (NO at 216) returns to process the next mode at 211-215 as described above. Once all modes have been processed (YES at 216), the method 200 returns to transmit and convert receive signals for the M modes and another iteration at 202-207 as previously described.

In certain examples, the individual windows 142, 144 and 146 have an angular spectral response that corresponds to the combined angular coverage field of view (FOV) of the transmit and receive antennas 106, 108 for the corresponding modes LRR, MRR, SRR, respectively, to minimize the total weighted energy outside the FOV of the combined antenna (Tx and Rx antennas) Moreover, the spectral leakage of each window 142, 144 and 146 is low in the FOV region and increases at far-off angular offset from the main lobe of the combined transmit and receive antenna angular spectral response for the corresponding mode. This increasing spectral leakage with far-off angular offset from the main lobe operates to push out much of the spectral leakage into regions where leakage tolerance is high due to the corresponding field of view of the transmit and receive antennas 106, 108. Unlike conventional windows for which the spectral leakage decreases with offset from the main lobe, the pushing windows 142, 144 and 146 facilitate angle determination to allow small main lobe angular width to discriminate between objects with greater angular resolution, while pushing the spectral leakage outward away from the main lobe to an extent that the angular response of the combined transmit and receive antennas 106, 108 for the corresponding mode attenuates that spectral leakage naturally.

The pushing windows 142, 144 and 146 advantageously avoid the trade-off between spectral leakage and angular resolution inherent in conventional or traditional windowing approaches. In certain examples, the individual windows 142, 144 and 146 each correspond to a particular one of the modes, and the pushing windows 142, 144 and 146 are each unique. In addition, in certain examples, each pushing window 142, 144 and 146 has an angular spectral response that corresponds to the combined angular coverage field of view of the transmit and receive antennas 106, 108 for the given one of the modes LRR, MRR or SRR, respectively. As illustrated and described further below in connection with FIGS. 8, 10, 20 and 21. The window data 140 stored in the memory 104 for each window 142, 144 and 146 in one example includes window coefficients computed as a weighted least squares solution that minimizes a total weighted energy outside a main lobe of the angular spectral response. In addition, the angular width of the main lobe of the angular spectral response for each window 142, 144 and 146 is less than the combined angular coverage field of view of the transmit and receive antennas 106, 108 for the corresponding mode. The present disclosure provides techniques and systems to pre-process multi-channel RX data in a radar system prior to performing a frequency transform based angle of arrival estimation by windowing the data across receive chains using a leakage-tuning pushing window. The disclosed system 100 exploits the limited field of view of a typical combined transmit and receive antenna array, which provides an inherent attenuation to objects outside the field of view, and the disclosed multi-mode radar system 100 dynamically employs a mode-specific pushing window 142, 144 or 146 based on the mode of operation of the radar.

Figure 3:
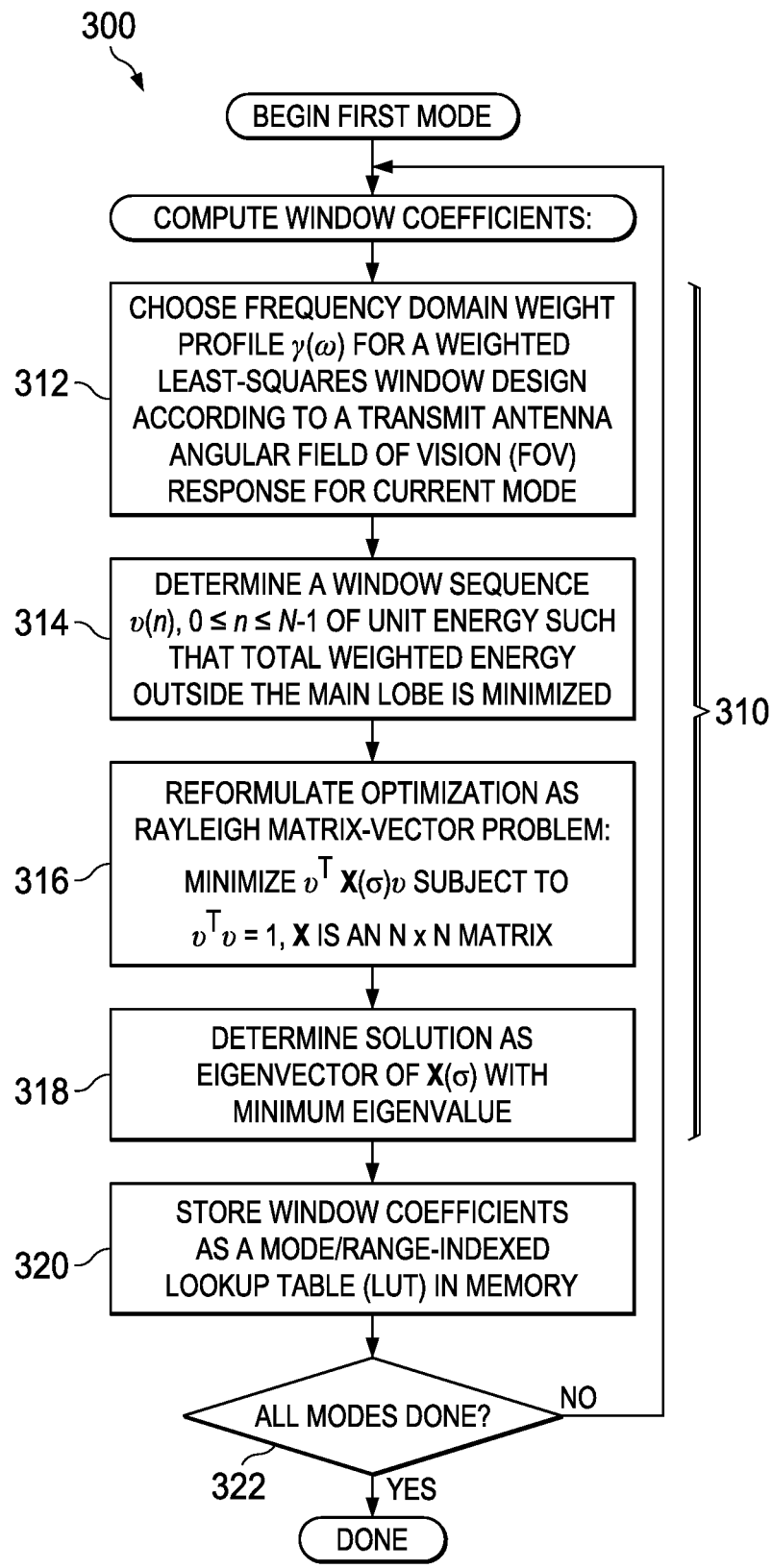
FIG. 3 is a flow diagram of a method for configuring a multi-mode radar system.

Referring now to FIG. 3, further aspects of the present disclosure provide methods to configure a multi-mode radar system. FIG. 3 shows a method 300 for configuring a radar system, such as the system 100 in FIG. 1. The process or method 300 can be implemented in certain examples in an off-line process to generate the predetermined pushing windows 142, 144 and 146 in the described three-mode example, where the window length for each mode should correspond to the number of antennas used for that mode. The method 300 can also be implemented on-line (e.g., during radar operation on the field). Again, this is an example flow for determining mode-appropriate window coefficients. Similar processing can be used for any multi-mode system that implements M different modes, where M is an integer greater than 1. The method 300 in FIG. 3 begins for a first mode by computing the pushing window coefficients for the current mode at 310, and the window coefficients are stored as a mode/range-indexed lookup table (LUT) in the memory 104 at 320. The process is then repeated, as needed, until windows for all the necessary modes are finished.

For each given mode (e.g., LRR, MRR and SRR), the window is configured by choosing or otherwise determining a frequency domain weight profile $\gamma(\omega)$ at 312 based on the combined angular coverage field of view of the transmit and receive antennas 106, 108 for the given mode. Thereafter, window coefficients are computed at 314, 316 and 318 for the given mode based on the frequency domain weight profile $\gamma(\omega)$ using a weighted least squares algorithm. In one possible implementation, a window sequence $v(n)$, $0 \leq n \leq N-1$ of unit energy is determined using the optimization problem which is formulated at 316 as a Rayleigh matrix-vector problem to minimize a function $v^T X(\sigma) v$, subject to $v^T v = 1$, where X is an N×N matrix. At 318, a solution to the matrix-vector problem is determined as an eigenvector of $X(\sigma)$ with a minimum eigenvalue. This eigen vector which minimizes the eigen value provides the pushing windows for which the spectral leakage increases with far-off angular offset from the angular spectral response main lobe, and the total weighted energy outside the main lobe is minimized.

Figure 4:
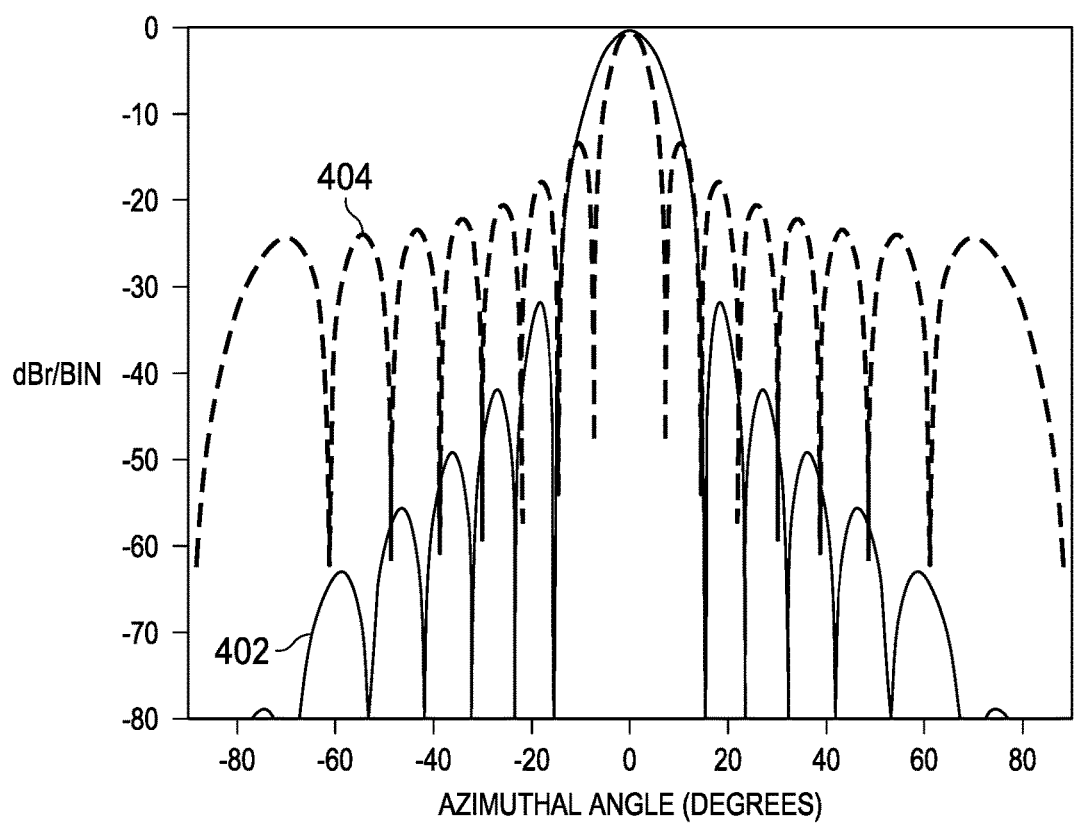
FIG. 4 is a graph of angular spectral response curves for a Hann window and a rectangular window.

Referring also to FIGS. 4-10, FIG. 4 shows an angular response graph 400, including an example Hann window curve 402 and a rectangular window curve 404. Angular resolution in conventional radar systems is inherently poor due to the limited size of the antenna array, and in certain applications may be partially improved by cascading multiple systems to achieve a larger affective array. Windowing can be used to reduce FFT leakage among different objects, but use of conventional window types, such as those shown in FIG. 4 can cause further angular resolution loss. As seen in FIG. 4, the typical trade-off is between the width of the main lobe, and spectral leakage. Use of a conventional Hann window provides a spectral response exemplified by a curve 402 which controls spectral leakage, but results in a relatively wide main lobe. The resulting wide main lobe degrades the angular resolution of the system. If a rectangular window is instead used, a narrower main lobe and corresponding improvement in angular resolution can be achieved. However, the rectangular window provides poor spectral leakage (e.g., higher side lobes), as shown in the curve 404.

Figure 5:
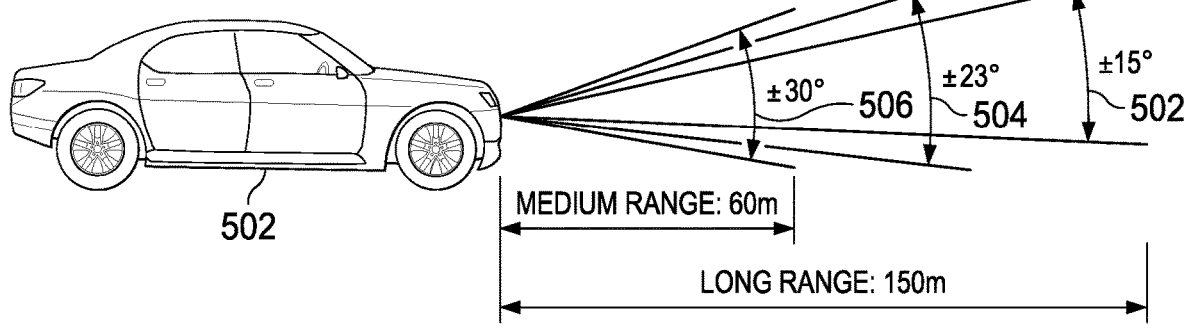
FIG. 5 is a simplified side elevation view of a vehicle-mounted multi-mode radar system of multiple angular ranges or modes.

FIG. 5 illustrates a vehicle or application of a multi-mode radar system providing three modes for different ranges of radar detection. In this example, a first mode implements long-range radar with an angular range or field of view 502 of approximately +/−15°. A second mode provides medium-range radar with an field of view 504 of +/−23°, and a third mode implements short range radar with an field of view 506 of +/−30°. The inventors have appreciated that the transmit antenna responses are typically different for the different modes of a multi-mode radar system. In the above described multi-mode system 100 of FIG. 1, the radar frames can be interlaced or interleaved in time for multiplexed tracking across different ranges associated with the different modes (e.g., LRR, MRR, SRR).

FIGS. 6 and 7 illustrate graphs 600 and 700 showing example chirp signals for a long-range mode and a medium-range radar mode, respectively, in the example system 100. FIGS. 6 and 7 show separate frames with LRR chirps and MRR chirps for one non-limiting example implementation. Other examples systems might interleave LRR and MRR chirps within a single frame, and appropriately process the resultant data matrix for the two modes. In FIG. 6, three example chirp signals 602, 604 and 606 are shown using a sawtooth type frequency modulation implemented by the frame and chirp timing circuit 112, with linearly increasing frequency across each chirp signal, where a given frame for this particular mode includes an integer number "i" chirp signals (e.g., transmitted at 202 in FIG. 2 above). In FIG. 7, three example sawtooth chirp signals 702, 704 and 706 are shown for medium-range operation in a second mode of the system 100, where the individual signals 702, 704 and 706 implement a faster modulation pattern (e.g., higher slope).

FIG. 8 shows a graph 800 including three different combined antenna gain response curves for operation of the transmit and receive antenna arrays 106, 108 in three corresponding ranges or modes. The first response curve 802 illustrates the antenna gain response with an angular coverage field of view of +/−15°, a second curve 804 illustrates the antenna field-of-view of +/−23° for a second operating mode, and a third curve 806 shows a transmit antenna field-of-view of +/−30°.

FIG. 9 provides a graph 900 showing example angular spectral response curves for a rectangular window (curve 902) and a mode-specific pushing window (curve 904), along with the antenna gain response curve 804 from FIG. 8 for the MRR mode. The concepts of the present disclosure take into account the mode-dependent limited combined field of view of the combined transmit and receive antennas 106, 108 across different radar modes to provide intelligent dynamic selection and use of mode-specific pushing windows 142, 144 or 146 depending on the current mode of operation in the radar system 100. The examples of FIG. 9 are for a 16 element receive antenna array 108 (N=16) for the medium-range antenna response with a FOV of +/−23°. As seen in FIGS. 8 and 9, the combined transmit and receive antenna gain response falls by more than 10 dB beyond the +/−23° angular range. As shown in FIG. 9, the main lobes at the center of the angular range for each of the curves 902 and 904 are of substantially equal width. Thus, the pushing window response shown in the curve 904 provides substantially equal angular resolution as the response curve 902 of the conventional rectangular window. In this example, the −20 dB points for the rectangular and pushing windows of curves 902 and 904 are 6.5° and 7.4°, respectively. In addition, the pushing window spectral response curve 904 has lower side lobes than the rectangular window response curve 902 within the FOV.

As shown in FIG. 9, the pushing window (e.g., the MRR window 144 in the example of FIG. 1) represented by the curve 904 provides significantly reduced spectral leakage than the rectangular implementation shown in curve 902. Moreover, although the spectral leakage of the pushing window (curve 904) increases outside the FOV of interest, the spectral leakage inside the FOV due to an object of equal strength outside the FOV is also limited. Thus, the intelligent window design of the present disclosure accounts for the antenna gain mask, and the effective leakage level is less than −20 dB in the FOV of interest. The present disclosure thus advantageously provides mode-specific weight windows for angle FFT processing. Moreover, the process 300 of FIG. 3 provides a method to use the antenna FOV information to design and store predetermined mode-dependent weight window functions for angle FFT processing, where the spectral leakage of the desired window is shaped according to the combined transmit and receive antenna response for a given mode in a multi-mode radar system 100. These concepts can be successfully used to minimize the angle resolution lost during windowing in the third FFT processing in the rater system 100, while achieving angular resolution very close to rectangular windows and providing significantly improved spectral leakage in the FOV of interest.

FIG. 10 provides a graph 1000 illustrating further advantages of the example pushing window 144 designed for the combined transmit and receive antenna angular coverage field of view 1001 (e.g., +/−23°) for the MRR operating mode of the system 100. FIG. 10 shows a curve 1002 representing the angular spectral response for a first object inside the antenna field of view 1001 (e.g., at a first angle θ1 of 0°), and curves 1003 and 1004 representing the spectral response due to reflections or echoes from a second object outside the antenna field of view 1001 (e.g., at an angle θ2 of +72°). The curve 1003 in this example represents the spectral response excluding the composite effect of the window and the transmit and receive antenna gain response, and the curve 1004 represents the spectral response including the composite effect of the window and the transmit and receive antenna gain response for the second object. As seen in the graph 1000, the additive effect of the combined antenna gain spectral response and the pushing window 144 reduces the energy interference of the second object in the main lobe at 0° by approximately 12 dB indicated at 1006 in FIG. 10. In addition, the disclosed pushing window 144 provides a reduction shown at 1008 outside the FOV of the transmit antenna at the +72° location of the second object.

Figure 11:
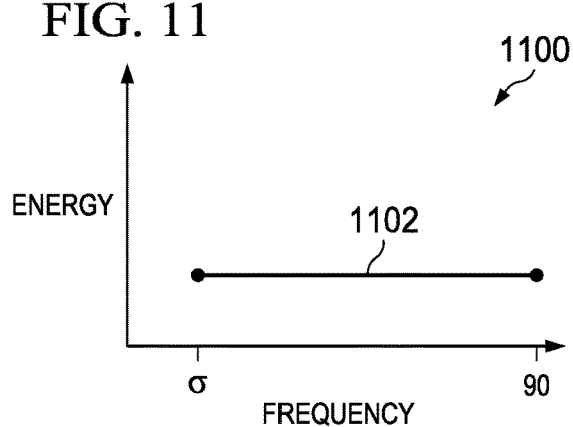
FIG. 11 is a graph of an example energy versus frequency curve to minimize energy in a stop band for designing a window.
Figure 12:
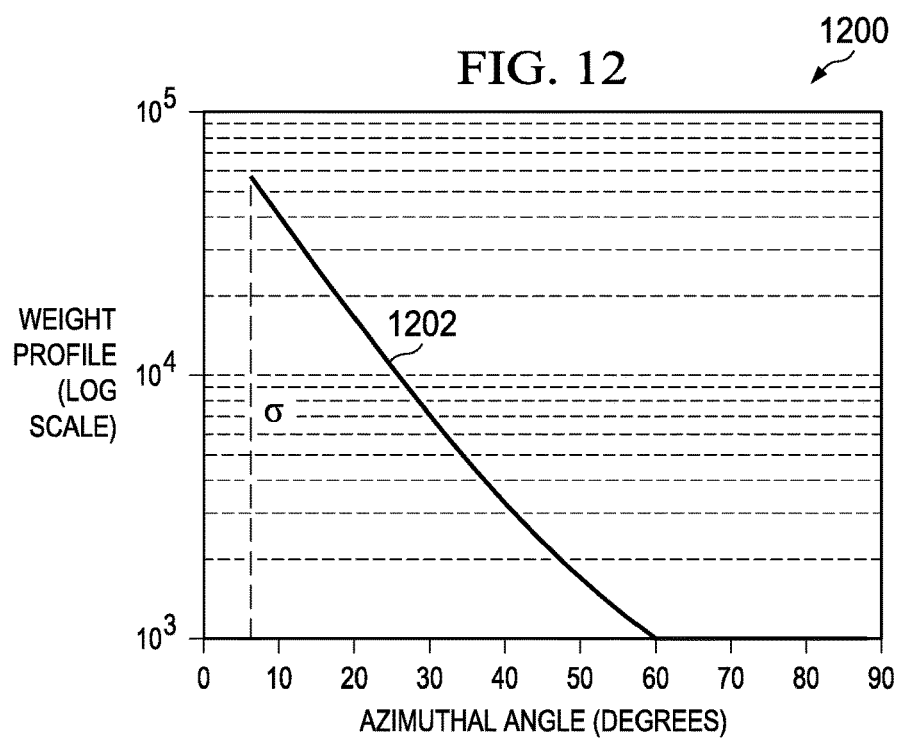
FIG. 12 is a graph of an example frequency domain weight profile for designing a window.
Figure 13:
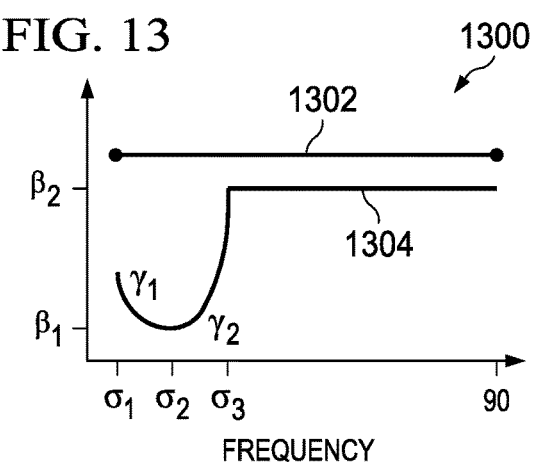
FIG. 13 is a graph of an example piece-wise exponential weight function profile to minimize energy subjected to a weight function.

Referring also to FIGS. 3 and 11-15, a variety of different techniques can be used to configure a multi-mode radar system (e.g., system 100 above) for signal processing to assess angle information using pushing windows. FIG. 11 provides a graph 1100 showing an example energy versus frequency curve 1102 from an angle σ to +90° to minimize energy in a stop band for designing a pushing window, FIG. 12 provides a graph 1200 including a curve 1202 showing an example frequency domain weight profile for designing a window according to the angle σ representing the beginning of a stop band for a given FOV associated with a corresponding operating mode for the multi-mode system 100. FIG. 13 provides a graph 1300 showing another example weight function profile curve 1302 representing a stop band from a first angle σ1 to +90° and a piece-wise exponential weight function profile curve 1304 to minimize energy subjected to a weight function.

Unlike standard windows used in spectral analysis, the disclosed pushing windows provide the flexibility to shape the leakage profile of the designed weight window 142, 144, 146 differently in different frequency bands. This advantageously enables controlled trade-off between the key performance metrics of the window, particularly in the context of FMCW radar FFT processing, although the disclosed windows can be used in other processing applications to push out much of the spectral the leakage into regions where leakage tolerance is high. In FMCW radar signal processing, FFTs are often used to estimate the range as well as the velocity of the detectable targets. Even the angular position of the targets is estimated by performing an FFT over the outputs from multiple receive chains in the radar, where the different receive chains are connected to different discrete receiver antenna elements in an antenna array. In certain implementations, weight windows are applied before the FFT processing at each stage in order to reduce the side-lobe levels compared to that of a default rectangular window. FMCW radar includes transmission of a constant envelope pulse with a shaped frequency modulation, such as a linear ramp in frequency, called a chirp signal. The reflected received signal is mixed with the transmitted signal to create an intermediate frequency (IF) or beat signal. In the beat signal of each chirp, objects at different ranges (distances) appear as tones at beat frequencies proportional to their respective distances, and a first dimensional ($1^{st}$D) FFT processing is used (e.g., 211 in FIG. 2 above) to separate the objects in the range domain. Velocity separation (and often, object estimation) involves transmitting a sequence of many chirps, and processing the data across chirps in each mode (from the $1^{st}$D FFT) using a second dimensional ($2^{nd}$ D) FFT (212 in FIG. 2). In radar, the signal strength of the received echo often decays at 40 dB/decade (e.g., path loss $\propto r^{-4}$, where r is the range of the target object). In this case, during the $1^{st}$ D FFT processing, low frequency FFT mode bins, corresponding to nearby objects, tend to have much stronger signals compared to bins near the band edge, corresponding to far-off objects. Therefore, one of the important characteristics required of the window frequency response for $1^{st}$D FFT processing is that it should have a fast roll-off so that the far-off spectral leakage is small. This ensures that the return signals from the weaker targets which are farther away from the radar do not get masked-out by the spectral leakage of the targets closer to the radar. Another desirable characteristic is a small main lobe width of the window frequency response. A small main-lobe width provides better minimum resolution bandwidth. This is the ability to resolve spectral tones of equal strength at arbitrary spectral locations. This quantity can be measured in terms of number of bins after which the spectral leakage drops to −3 dBr and −6 dBr levels. Narrow main lobes also provide better equivalent noise bandwidth (ENBW), which quantifies the noise included in the bandwidth of the window. This quantity is also measured in terms of numbers of bins, with the ENBW of a rectangular window being normalized to one bin.

In most of the classical windows, such as hamming, Hann, etc., the spectral characteristics of the window are fixed by the window length. There also exist window families, e.g., Kaiser windows, which provide parameters to trade-off the main-lobe width against the side-lobe leakage level. Certain spectral leakage specifications account for a desired detection signal to noise ratio SNR, as well as variations in radar cross section (RCS) among different objects, and follows a 40 dB/decade roll-off with range, except for the flooring at very high range offsets determined by other system impairments such as multiplicative noise skirt levels, etc. Kaiser windows generally meet the leakage specification quickly, but with a much wider main lobe. In contrast, the Hann window has a far better (narrower) main lobe, but violates the leakage spec until much farther out. In a typical radar application, neither choice might be satisfactory. In particular, a Kaiser window with a wide main lobe sacrifices range resolution, which is a performance parameter of key interest in radar (and is otherwise limited only by the chirp bandwidth, an 'expensive' resource). However, a high near-by spectral leakage using a Hann window can cause strong objects to mask some relatively weaker (lower RCS) neighbors, which is also undesirable. The disclosed pushing window method can be used to design a new window which facilitates performance that is closer to the Hann window in terms of main lobe characteristic, and yet decays fast enough outside the main lobe to quickly satisfy the leakage performance specifications. Another goal is improvement in the angular resolution for estimating target angular position using the $3^{rd}$ D FFT processing across receive chains (e.g., 215 in FIG. 2 above). In many applications, such as Long-Range Radar (LRR), the transmit antennas 106 of the radar predominantly illuminate only a certain angular region or Field of View FOV, thereby effectively providing a relative attenuation to reflectors present outside the angular coverage region. The presently disclosed pushing windows exploit this fact to design a new class of weight window functions which push much of the spectral leakage outside the angular coverage region of interest, while not degrading the main lobe significantly compared to a rectangular window. In this manner, the disclosed pushing windows facilitate near-optimal angular resolution while still keeping near-by leakage at acceptable levels.

One class of optimal windows is called prolate spheroidal windows, which can be designed by solving an optimization problem with the goal of determining a real discrete sequence of a fixed length and unit energy such that the energy in the frequency region $\sigma \le \omega < \pi$ (outside the main lobe of the window) is minimized (e.g., FIG. 11). This optimization problem can be formulated as a matrix eigenvector problem, which can be solved numerically in one example. Kaiser windows represent a good closed-form approximation to the class of prolate spheroidal windows. The design process of FIG. 3 uses non-uniform weighting functions. In one example, the prolate spheroidal window problem statement can be generalized and solved for non-uniform weight profiles which fall in the "piece-wise exponential" or "piece-wise polynomial" categories (or a mixture of them). For example, FIG. 13 shows a non-uniform stop-band weight profile, in which the region $[0, \sigma_1]$ is the main lobe of the desired window in the frequency domain. In many applications, it is desirable to attenuate the far-off spectral leakage of the window as fast as possible. This can be achieved by the exponentially increasing weight profile controlled by the parameter $\gamma_2$ in the $[\sigma_2, \sigma_3]$ region of FIG. 13. It may also be desirable to narrow the main lobe of the window to achieve better spectral resolution. This can be achieved by the exponentially increasing weight profile controlled by the parameter $\gamma_1$ in the $[\sigma_1, \sigma_2]$ region of FIG. 11. The equations for the weight profiles for the different regions are as given below.

$$\alpha_1(\omega) = \beta_1 e^{\gamma_1 \left( \frac{\sigma_2 - \omega}{\sigma_1} \right)}, \sigma_1 \le \omega < \sigma_2$$

$$\alpha_2(\omega) = \beta_1 e^{\gamma_2 \left( \frac{\omega}{\sigma_2} - 1 \right)}, \sigma_2 \le \omega < \sigma_3$$

$$\alpha_3(\omega) = \beta_2, \sigma_3 \le \omega \le \pi$$

$$\beta_2 = \alpha_2(\omega = \sigma_3) = \beta_1 e^{\gamma_2 \left( \frac{\sigma_3}{\sigma_2} - 1 \right)}$$

One goal is to find a fixed length sequence of real numbers, v(n), (a window function) such that the net weighted energy is minimized outside the main-lobe. The metric or cost function to be minimized in this example is:

$$\phi = \frac{1}{\pi} \int_{\sigma_1}^{\sigma_2} \alpha_1(\omega) |V(e^{j\omega})|^2 \partial \omega +$$

$$\frac{1}{\pi} \int_{\sigma_2}^{\sigma_3} \alpha_2(\omega) |V(e^{j\omega})|^2 \partial \omega + \frac{1}{\pi} \int_{\sigma_3}^{\pi} \alpha_3(\omega) |V(e^{j\omega})|^2 \partial \omega$$

Where $V(e^{j\omega})$ is the DTFT of the desired window, and v(n), n=0, 1, . . . . N−1. The above cost function which needs to be minimized can be re-written in matrix form as follows:

$$\phi = \frac{1}{\pi} v * Q v, \text{ where } Q \equiv X + Y + Z.$$

The closed form expressions for the matrices X, Y and Z, in terms of the weight function parameters described above, are set forth below. In one example, the Rayleigh principle can be used, which states that the unit norm vector v, which minimizes the cost function given by the above equation for corresponds to the eigenvector having the minimum eigenvalue for the matrix Q. The desired window coefficients can be found by performing the singular value decomposition (SVD) of the matrix Q. The resulting window is symmetric, which enables efficient hardware implementation.

Figure 14:
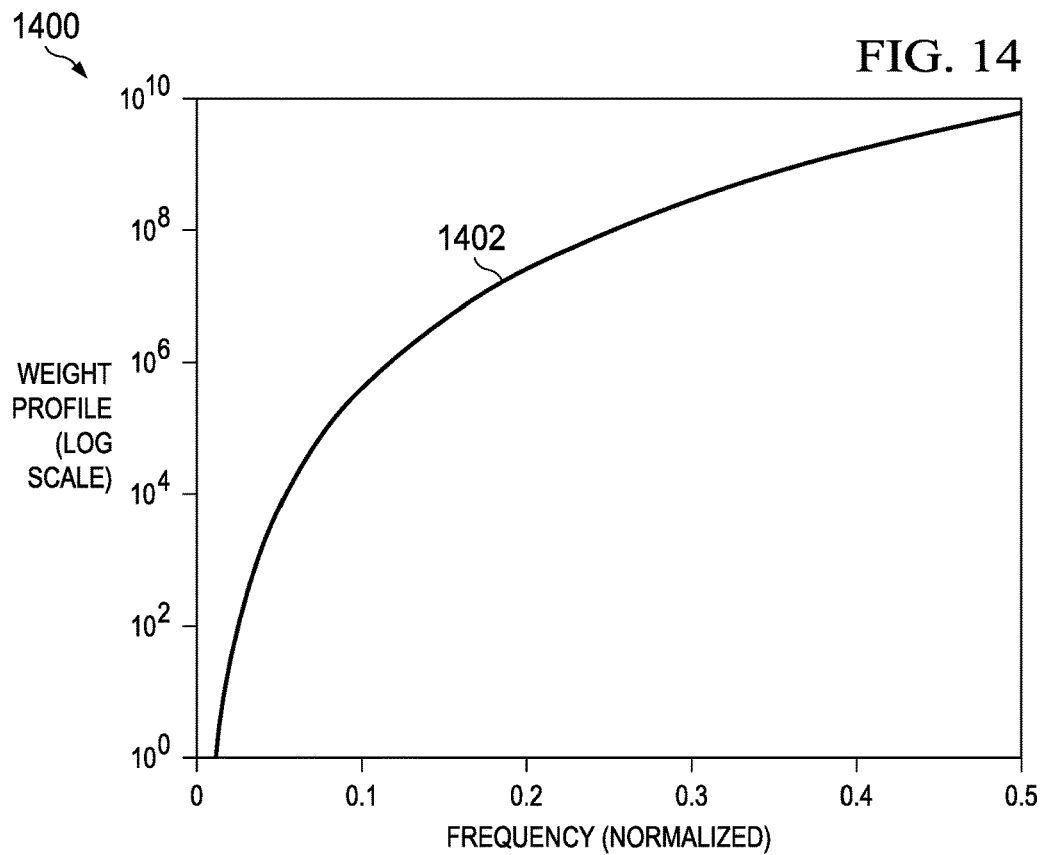
FIG. 14 is a graph of an example polynomial weight profile.
Figure 15:
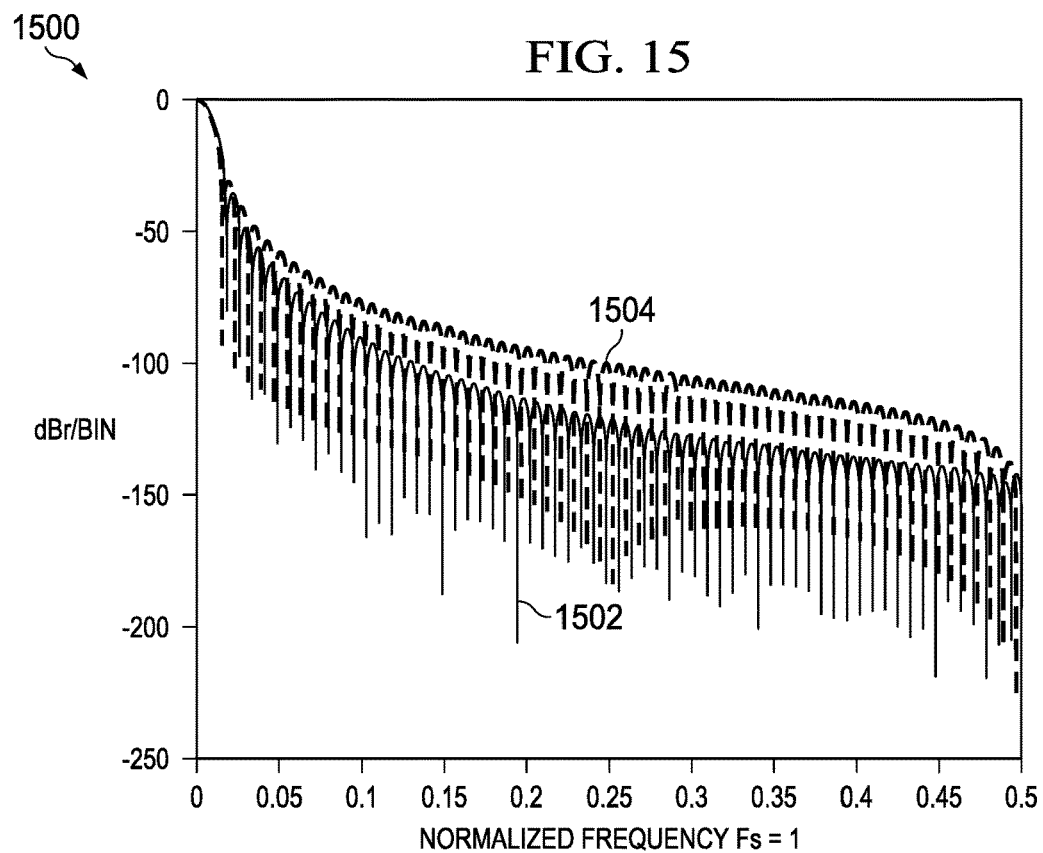
FIG. 15 is a graph of example spectral response curves for a mode-specific window and a Hann window.
Figure 16:
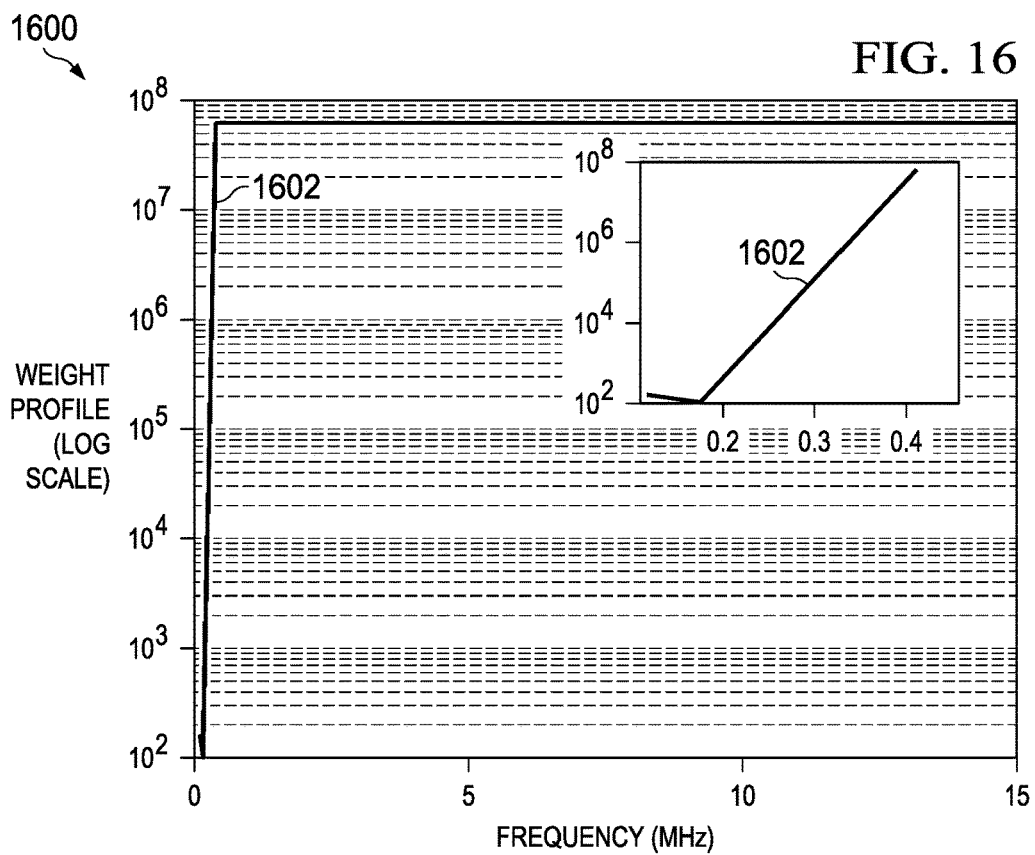
FIG. 16 is a graph of an example piece-wise exponential weight profile.

FIG. 14 is a graph 1400 showing a polynomial weight profile curve 1402 as a function of normalized frequency, and a graph 1500 in FIG. 15 shows example spectral response curves 1502 and 1504 for a mode-specific window and a Hann window, respectively. Piece-wise polynomial weighting functions can be derived as described further below, and such weighting facilitates generation of some new window functions which many find application in various fields. FIG. 15 shows an illustrative example based on the polynomial weight profile of FIG. 4. In particular, the curves 1502 and 1504 show comparative frequency response of the disclosed pushing windows (1502) designed using the weight profile 1402 against the Hann window (1504).

Table 1 below shows performance comparison of the example new window designed using the disclosed weighted least-squares method against the Hann window.

TABLE 1

|  | ENBW (bins) | −3 dBr (bins) | −6 dBr (bins) | PSL (dB) | Roll-off (dB/decade) |
| --- | --- | --- | --- | --- | --- |
| Hann | 1.51 | 1.44 | 2.0 | −31.46 | 60 |
| New window | 1.63 | 1.56 | 2.17 | −35.36 | 78 |

As seen in Table 1, The example new window has a better peak side lobe level (e.g., −4 dB better than Hann) and a far better measured roll-off decay at the cost of marginal degradation in ENBW, −3 dBr and −6 dBr parameters.

A new window design can be created for the $1^{st}$D FFT processing in FMCW radar (e.g., 211 in FIG. 2). In one example, a window length of N=512 is assumed for a sampling rate Fs=30 MHz. In FMCW radar, both the $1^{st}$D FFT and $2^{nd}$ D FFT outputs are used to jointly estimate the range and velocity of targets. A new window can be designed using the above-described model with the following example parameters:

$$N = 512, \sigma_1 = 2\pi \frac{1.5}{N}, \sigma_2 = 2\pi \frac{3}{N},$$

$$\sigma_3 = 2\pi \frac{7}{N}, \gamma_1 = 1, \gamma_2 = 10, \beta_1 = 100$$

Figure 17:
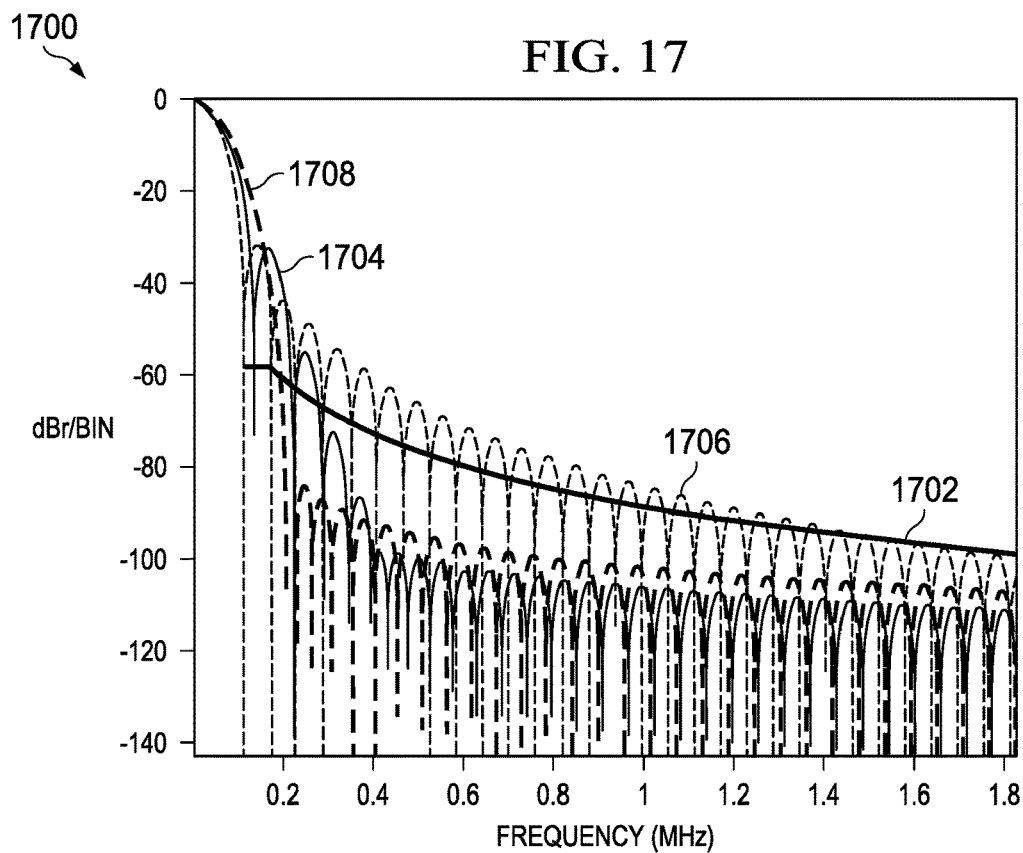
FIG. 17 is a graph of example spectral response curves for a mode-specific window, a Hann window, and a Kaiser window.

Referring also to FIGS. 16-21, FIG. 16 provides a graph 1600 that shows an example piece-wise exponential weight profile curve 1602 which can be used in one example to derive a new example window. FIG. 17 shows a comparison of the frequency response of the new example window with the Hann and Kaiser windows, and Table 2 presents the performance comparison in terms of some key window comparison metrics. A graph 1700 and FIG. 17 illustrates a leakage specification curve 1702 along with example spectral response curves 1704, 1706 and 1708 for a the new example window, a Hann window, and a Kaiser window, respectively.

TABLE 2

|  | ENBW (bins) | −3 dBr (bins) | −6 dBr (bins) | Leakage Spec compliance offset |
|---|---|---|---|---|
| Hann | 1.5 | 1.43 | 2 | 1.61 MHz |
| Kaiser | 1.93 | 1.83 | 2.56 | 207 KHz |
| New Window | 1.72 | 1.64 | 2.28 | 278 KHz |

The Hann window provides poor leakage performance, as seen in curve 1706. In contrast, the Kaiser window curve 1708 is the fastest to meet the ideal leakage specification, but at the cost of poor ENBW, −3 dBr and −6 dBr parameters as compared to the Hann window. As seen in FIG. 17, moreover, the new example window (curve 1704) provides better ENBW and better SNR in a frequency bin, along with better spectral resolution (i.e., −3 dBr and −6 dBr parameters) than the Kaiser window (curve 1708). In addition, the new example window curve 1704 meets the leakage specification (curve 1702) fairly quickly. It is further noted in FIG. 17 that the peak side lobe level of the new example window curve 1704 is no worse than that of the Hann window curve 1706 (−31.85 dBr).

Figure 18:
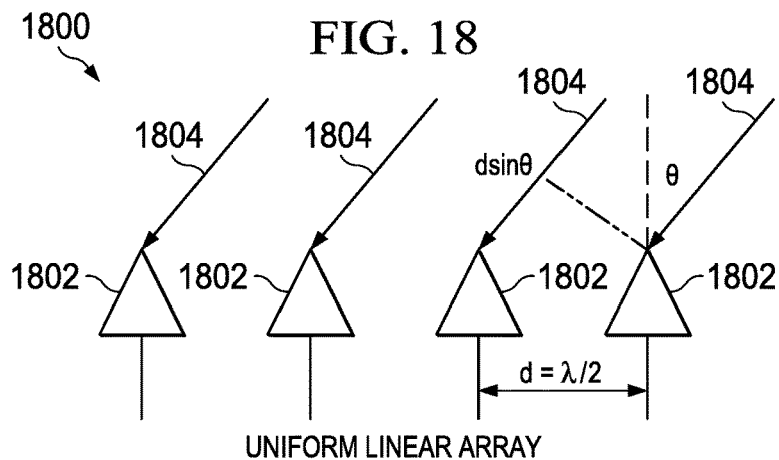
FIG. 18 is a simplified schematic diagram of a uniform linear receiver antenna array.

FIG. 18 illustrates a uniform linear receiver antenna array 1800, including receiver antennas 1802, along with incident receive angles 1804. As previously mentioned, the pushing window techniques can be employed for the windowing prior to the third FFT operation (e.g., at 214 in FIG. 2 above). The $2^{nd}$ D FFT outputs from multiple received chains are used to estimate the azimuthal angular position of the targets with respect to the radar, by performing an angular domain FFT (referred to as the $3^{rd}$ D FFT). In scenarios where multiple targets cannot be resolved in the range and velocity dimensions, such can often be resolved using the $3^{rd}$ D FFT. As shown in FIG. 18, in a uniform linear array, the signal reaching each receive antenna 1802 undergoes an additional path delay related to the sine of the angular position of the target, which manifests itself as a spatial frequency. Hence, the third FFT can be used to determine the direction of arrival (DOA) of the targets. Also, there could be arrays with antenna spacing deliberately kept larger than λ/2, when the FOV is known to be smaller, etc.

The pushing windows 142, 144, 146 described above can used for window processing before performing the $3^{rd}$ D FFT. This approach takes advantage of the fact that the antenna gain is typically maximum along the bore sight and decays as a function of azimuthal angle, for example, as illustrated above in FIG. 8 for an example 3 mode system (M=3). For example, in certain implementations it can be assumed that the antenna gain drops by at least 10 dB beyond ±15° (e.g., for LRR applications) with respect to its maximum gain along the bore sight (i.e., 0°). Beyond ±15°, a modest decay profile can be assumed for the antenna gain.

Figure 19:
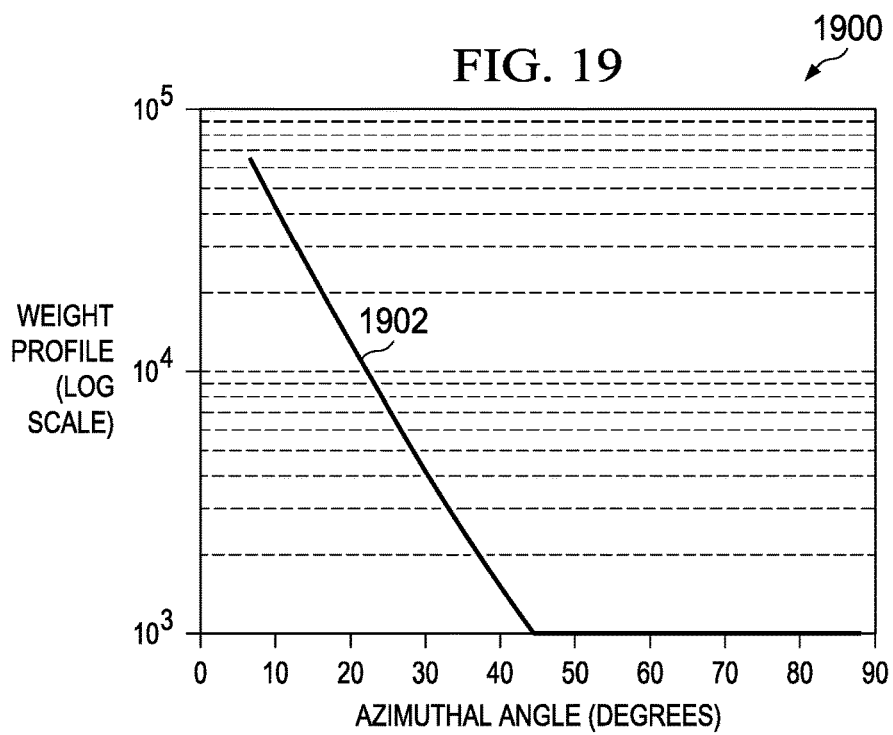
FIG. 19 is a graph of an example weight profile for a mode-specific pushing window.
Figure 20:
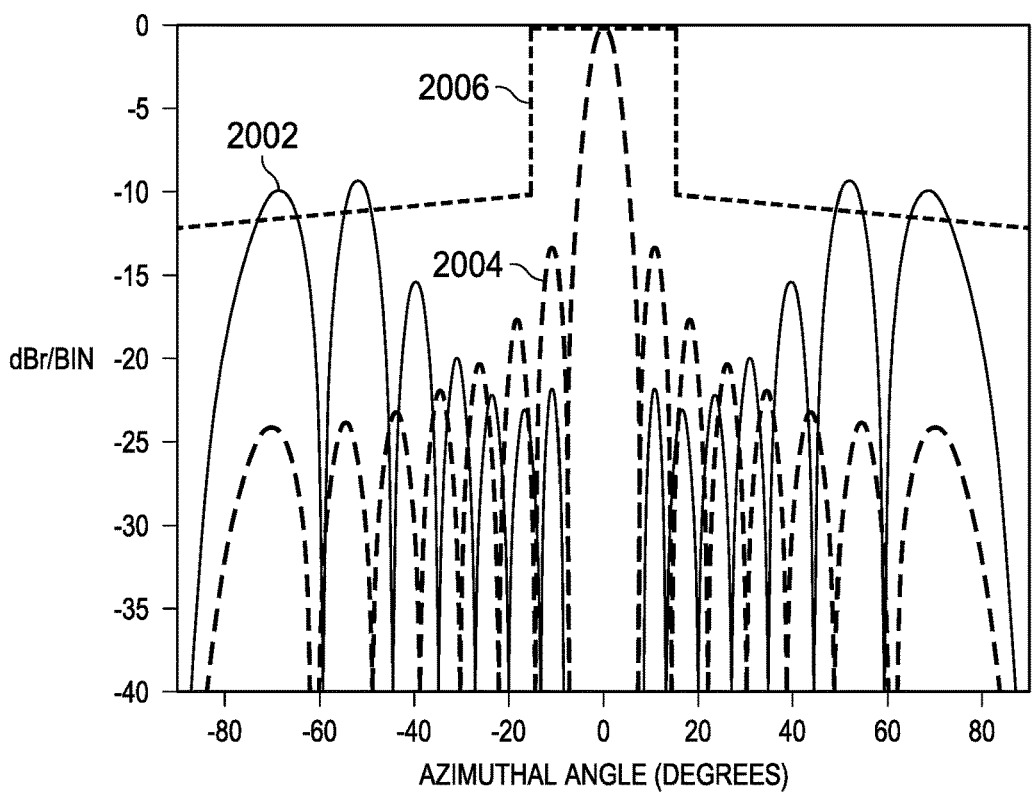
FIG. 20 is a graph of example spectral response curves for a mode-specific combined transmit and receive antenna gain response, a mode-specific pushing window, and a rectangular window.

FIG. 19 shows the weight function and FIG. 20 shows the spectral response of the pushing window as a function of azimuthal angle designed using the above-described model, with the following parameters:

$$N = 16, \sigma_1 = 2\pi \frac{0.9}{N}, \sigma_2 = 0.7\pi,$$

$$\sigma_3 = \pi, \gamma_1 = 0.8, \gamma_2 = 0, \beta_1 = 1000$$

FIG. 19 provides a graph 1900 showing an example weight profile curve 1902 for a mode-specific pushing window design. FIG. 20 provides a graph 2000 that shows example spectral response curves 2002, 2004 and 2000 for a mode-specific pushing window, a rectangular window and a mode-specific combined transmit and receive antenna gain response, respectively. Unlike the classical windows, the spectral leakage of the designed pushing window increases for larger azimuthal angles offset from the main lobe, which is precisely where there is more attenuation provided by the antenna gain pattern. In spite of this, the spectral leakage, in the angular range of interest (±15°), due to any object outside the main lobe is suppressed by at least 20 dB in this particular example (referred to as dynamic range). The angular resolution achieved by this pushing window for a 20 dB dynamic range in the angular range of interest is 7.3° which is very close to the ideal angular resolution of 6.5° achieved by a rectangular window. This example can be used, for instance, for the long-range LRR pushing window 142 described above.

Figure 21:
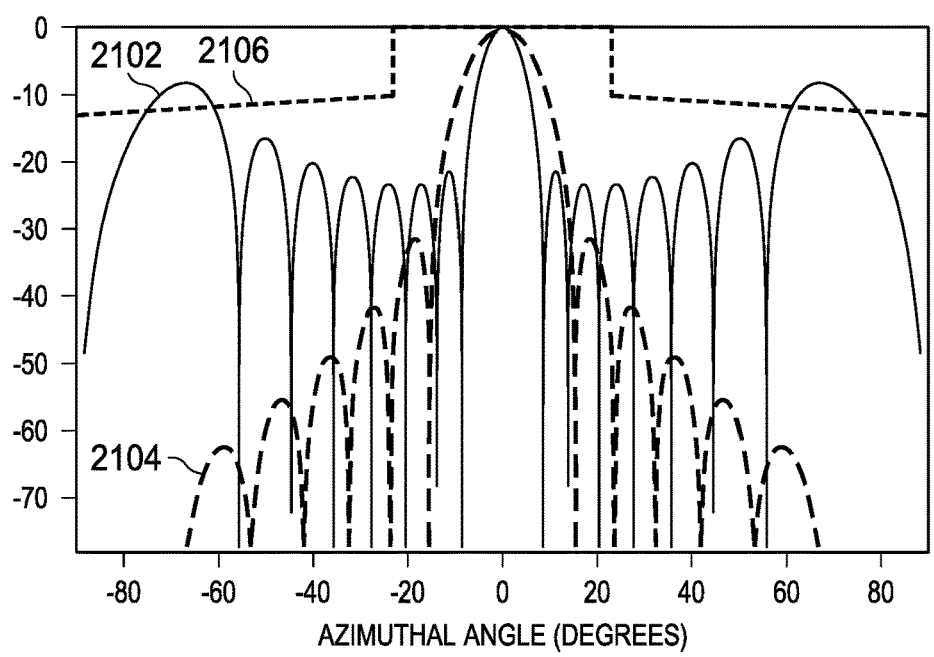
FIG. 21 is a graph of example spectral response curves for a range-specific combined transmit and receive antenna gain response, a mode-specific pushing window, and a Hann window.

FIG. 21 shows a graph including example spectral response curves 2102, 2104 and 2106 for a mode-specific pushing window, a mode-specific combined transmit and receive antenna gain angular response, and a Hann window, respectively. The example of FIG. 21 represents another pushing window design that uses the following parameters:

$$N = 16, \sigma_1 = 2\pi \frac{0.9}{N}, \sigma_2 = 0.866\pi,$$

$$\sigma_3 = \pi, \gamma_1 = 0.6, \gamma_2 = 0, \beta_1 = 1000$$

In this example, it is assumed that the antenna has a wider beam pattern where the gain drops by at least 10 dB beyond ±23°. This example pushing window can be used for the medium-range MRR pushing window 144 described above. The angular resolution achieved by the newly designed window for a 20 dB dynamic range is 7.46° while that of the Hann window is 12.72°. Unlike the pushing window, the Hann window is unable to exploit the non-uniform illumination (directivity) of the combined transmit and receive antenna beam pattern.

As seen above, piece-wise exponential and polynomial weight models can be used to design pushing windows to provide the flexibility to narrow the main lobe width for good angular resolution, while shaping the leakage spectrum of the window in the frequency domain. Windows designed using the disclosed techniques can help in meeting the stringent spectral leakage specification for the $1^{st}$D FFT processing in radar designs such as the above-described FMCW multi-mode radar system 100 without significant loss of range resolution. Further, the pushing windows 142, 144, 146 can help achieve near ideal angular resolution with a reasonable dynamic range. The disclosed techniques can also be used to generate targeted weight window functions with specific leakage characteristics for applications beyond radar, which employ FFT-based spectral analysis of signals.

The closed form expressions for the matrices X, Y and Z, in terms of the weight function parameters described above, are given as follows. X, Y and Z are positive definite Toeplitz matrices, respectively and v is the vector consisting of window coefficients. X, Y and Z in closed form are given as follows.

$$X(m,n) = \chi(m,n) \begin{bmatrix} e^{-\gamma_1 \frac{\sigma_2}{\sigma_1}} \left\{ \begin{array}{c} (m-n)\sin[(m-n)\sigma_2] - \\ \frac{\gamma_1}{\sigma_1}\cos[(m-n)\sigma_2] \end{array} \right\} \\ e^{-\gamma_1} \left\{ \begin{array}{c} (m-n)\sin[(m-n)\sigma_1] - \\ \frac{\gamma_1}{\sigma_1}\cos[(m-n)\sigma_1] \end{array} \right\} \end{bmatrix}, m \neq n$$

$$\chi(m,n) = \left\{ \frac{\beta_1 e^{\gamma_1 \frac{\sigma_2}{\sigma_1}}}{\pi \left[\frac{\gamma_1^2}{\sigma_1^2} + (m-n)^2\right]} \right.$$

$$X(m,n) = \left\{ \frac{\beta_1 \sigma_1}{\pi \gamma_1} e^{-\gamma_1 \frac{\sigma_2}{\sigma_1}} \left[ e^{-\gamma_1} - e^{-\gamma_1 \frac{\sigma_2}{\sigma_1}} \right], m = n \right.$$

$$Y(m,n) = \eta(m,n) \begin{bmatrix} e^{-\gamma_2 \frac{\sigma_3}{\sigma_2}} \left\{ \begin{array}{c} (m-n)\sin[(m-n)\sigma_3] + \\ \frac{\gamma_2}{\sigma_2}\cos[(m-n)\sigma_3] \end{array} \right\} \\ -e^{-\gamma_1} \left\{ \begin{array}{c} (m-n)\sin[(m-n)\sigma_1] - + \\ \frac{\gamma_2}{\sigma_2}\cos[(m-n)\sigma_2] \end{array} \right\} \end{bmatrix}, m \neq n$$

$$\eta(m,n) = \frac{\beta_1 e^{-\gamma_2}}{\pi \left[\frac{\gamma_2^2}{\sigma_2^2} + (m-n)^2\right]}$$

$$Y(m,n) = \left\{ \frac{\beta_1 \sigma_2}{\pi \gamma_2} e^{-\gamma_2} \left[ e^{\gamma_2 \frac{\sigma_3}{\sigma_2}} - e^{\gamma_2} \right], m = n \right.$$

$$Z(m,n) = \left\{ -\frac{\beta_2}{\pi(m-n)}\sin(m-n)\sigma_3, m \neq n \right.$$

$$Z(m,n) = \left\{ -\frac{\beta_2}{\pi}[\pi - \sigma_3], m = n \right.$$

Where X(m,n), Y(m,n) and Z(m,n) corresponds to the $m^{th}$ row and $n^{th}$ column entry of the matrices, respectively.

Figure 22:
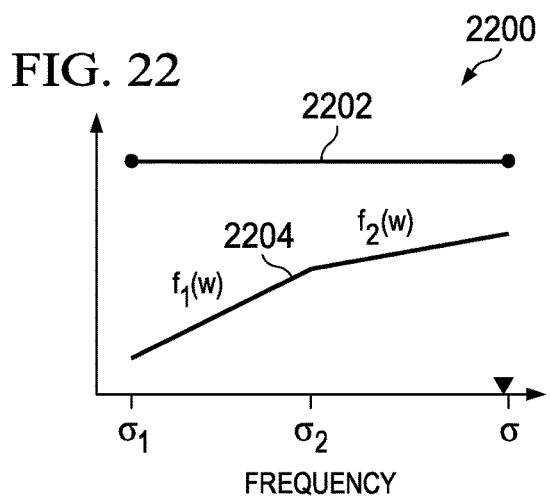
FIG. 22 is a graph of an example polynomial weight model weight function in a stop band.

Referring also to FIG. 22, in reference to the above discussion of polynomial weighting functions, the following illustrates detailed derivation for the example pushing window design techniques. A graph 2200 in FIG. 22 shows an example polynomial model weight function curve 2204 in a stop band illustrated by curve 2202 between an angle 61 and +90°. The region [0, $\sigma_1$] is the main lobe of the desired window in the frequency domain. The stop band region includes [$\sigma_1$, $\sigma_2$] and [$\sigma_2$, w] with different polynomial weight functions, $f_1(\omega)$ and $f_2(\omega)$, respectively.

The cost function to minimize is given by the following equation:

$$\phi = \frac{1}{\pi}\int_{\sigma_1}^{\sigma_2} f(\omega)|V(e^{j\omega})|^2 \partial\omega + \frac{1}{\pi}\int_{\sigma_2}^{\pi} f_2(\omega)|V(e^{j\omega})|^2 \partial\omega,$$

where $$f_1(\omega) = \alpha_0 \left(\frac{\omega}{\sigma_1}\right)^{\gamma/10},$$

$f_2(\omega)=1$, $\gamma$ is the desired roll-off decay rate in dB/decade, and $\alpha_0$ is the over-all scale factor. The above cost function can be written in matrix form as follows:

$$\phi = \frac{1}{\pi} v * Pv,$$

where P≡A+B, and where A, B are positive definite Toeplitz matrices, respectively and v is the vector consisting of window coefficients. A and B in closed form are given as follows.

$$A(m,n) = \left\{ \frac{\alpha_0}{\pi \sigma_1^\alpha} \begin{bmatrix} \sigma_1^{1+a}\text{Re}\{E_{-a}(-i(m-n)\sigma_1)\} - \\ \sigma_2^{1+a}\text{Re}\{E_{-a}(-i(m-n)\sigma_2)\} \end{bmatrix} \right., m \neq n$$

$$A(m,n) = \left\{ \frac{\alpha_0}{\pi \sigma_1^\alpha}\left(\frac{1}{1+a}\right)[\sigma_2^{1+a} - \sigma_1^{1+a}], m = n \right.$$

$$B(m,n) = \left\{ \begin{array}{l} \frac{-1}{\pi(m-n)}\sin[(m-n)\sigma_2], m \neq n \\ \frac{1}{\pi}(\pi - \sigma_2), m = n \end{array} \right.,$$

where A(m,n) and B(m,n) corresponds to the $m^{th}$ row and $n^{th}$ column entry of the matrices, respectively.

$$a = \frac{\gamma}{10},$$

$i=\sqrt{-1}$, $E_n(x)$ is the generalized exponential integral and Re(•) is the real part. In this example, the Rayleigh principle can be used to compute the window coefficients.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The following is claimed:

1. A method comprising:
determining, by a processor in a multi-mode radar system, a first frequency domain weight profile based on a first combined angular coverage field of view (FOV) for a transmit antenna and a receive antenna for a first mode of a set of modes;
determining, by the processor in the multi-mode radar system, a second frequency domain weight profile based on a second combined angular coverage FOV of a second set of transmit and receive antennas employed for a second mode;
computing, by the processor in the multi-mode radar system, first window coefficients for the first mode based on the first frequency domain weight profile and second window coefficients based on the second frequency domain weight profile;
receiving, by the processor of the multi-mode radar system, radar data from the receive antenna operating in the first mode; and
generating, by the processor in the multi-mode radar system, a three-dimensional object matrix including range, velocity, and angle data using the radar data and the first window coefficients for the first mode.

2. The method of claim 1, wherein the computed first window coefficients or second window coefficients are configured to reduce spectral leakage outside an angular response main lobe and inside the FOV.

3. The method of claim 2, wherein a spectral leakage of each window corresponding to the first window coefficients is shaped according to the first frequency domain weight profile.

4. The method of claim 1, wherein computing the first window coefficients for the first mode based on the first frequency domain weight profile uses a weighted least squares algorithm.

5. The method of claim 1, wherein the radar data is first radar data, the three-dimensional object matrix is a first three-dimensional object matrix, the range is a first range, the velocity is a first velocity, and the angle data is first angle data, and further including:
receiving, by the processor in the multi-mode radar system, second radar data from the receive antenna operating in the second mode; and
generating, by the processor in the multi-mode radar system, a second three-dimensional object matrix including a second range, a second velocity, and second angle data using the second radar data and the second window coefficients for the second mode.

6. A system comprising:
transmit antenna;
receive antenna;
a memory;
a processor coupled to the transmit antenna, the receive antenna, and the memory, the processor configured to:
determine a first frequency domain weight profile based on a first combined angular coverage field of view (FOV) for a transmit and receive antenna for a first mode of a set of modes;
determine a second frequency domain weight profile based on a second combined angular coverage field of view (FOV) for the transmit and receive antenna for a second mode of a set of modes;
compute first window coefficients for the first mode based on the first frequency domain weight profile and second window coefficients for the second mode based on the second frequency domain weight profile;
receive radar data from the receive antennas operating in the first mode; and
generate a three-dimensional object matrix including range, velocity, and angle data using radar data and the first window coefficients for the first mode.

7. The system of claim 6, wherein the computed first window coefficients are configured to reduce spectral leakage outside an angular response main lobe and inside the first combined angular coverage FOV.

8. The system of claim 6, wherein a spectral leakage of each window corresponding to the first window coefficients is shaped according to the first frequency domain weight profile.

9. The system of claim 6, wherein computing the first window coefficients for the first mode based on the first frequency domain weight profile uses a weighted least squares algorithm.

10. The system of claim 6, wherein the radar data is first radar data, the three-dimensional object matrix is a first three-dimensional object matrix, the range is a first range, the velocity is a first velocity, and the angle data is first angle data, the processor is configured to:
receive second radar data from the receive antenna operating in the second mode; and
generate a second three-dimensional object matrix including a second range, a second velocity, and second angle data using the second radar data and the second window coefficients for the second mode.

* * * * *